(12) United States Patent
Andersson et al.

(10) Patent No.: US 12,546,516 B2
(45) Date of Patent: Feb. 10, 2026

(54) HEAT EXCHANGER AND REFRIGERATION SYSTEM AND METHOD

(71) Applicant: SWEP International AB, Landskrona (SE)

(72) Inventors: Sven Andersson, Hässleholm (SE); Tomas Dahlberg, Helsingborg (SE)

(73) Assignee: SWEP International AB, Landskrona (SE)

( * ) Notice: Subject to any disclaimer, the term of this patent is extended or adjusted under 35 U.S.C. 154(b) by 152 days.

(21) Appl. No.: 17/789,269

(22) PCT Filed: Jan. 29, 2021

(86) PCT No.: PCT/SE2021/050066
§ 371 (c)(1),
(2) Date: Jun. 27, 2022

(87) PCT Pub. No.: WO2021/154151
PCT Pub. Date: Aug. 5, 2021

(65) Prior Publication Data
US 2023/0036818 A1    Feb. 2, 2023

(30) Foreign Application Priority Data

Jan. 30, 2020 (SE) .................... 2050093-0

(51) Int. Cl.
*F25B 39/02* (2006.01)
*F25B 40/06* (2006.01)
*F25B 49/02* (2006.01)

(52) U.S. Cl.
CPC ............ *F25B 39/024* (2013.01); *F25B 40/06* (2013.01); *F25B 49/02* (2013.01); *F25B 2600/2501* (2013.01); *F25B 2600/2513* (2013.01)

(58) Field of Classification Search
CPC .............................. F25B 39/024; F25B 40/06; F25B 2600/2501; F25B 2600/2513;
(Continued)

(56) References Cited

U.S. PATENT DOCUMENTS

| 4,307,779 A | 12/1981 | Johansson et al. |
| 4,376,460 A | 3/1983 | Skoog |

(Continued)

FOREIGN PATENT DOCUMENTS

| CN | 104019585 A | 9/2014 |
| CN | 108645077 A | 10/2018 |

(Continued)

OTHER PUBLICATIONS

PCT International Search Report for PCT Application No. PCT/SE2021/050066 mailed Mar. 23, 2021 (3 pages).

(Continued)

*Primary Examiner* — Frantz F Jules
*Assistant Examiner* — Devon Moore
(74) *Attorney, Agent, or Firm* — Merchant & Gould P.C.

(57) ABSTRACT

A brazed plate heat exchanger (100) includes a plurality of first and second heat exchanger plates (110, 120) having different patterns of ridges and grooves providing contact points between neighbouring plates under formation of interplate flow channels for fluids to exchange heat, said interplate flow channels being in selective fluid communication with first, second, third and fourth large port openings (O1, O2, O3, O4) and first and second small port openings (SO1, SO2) forming a suction gas heat exchanger together with a dividing surface (DW). The ridges (R1, R2a, R2b) and grooves (G1, G2a, G2b) are formed such that the interplate flow channels between different plate pairs have different volumes. Disclosed is also a refrigeration system and method including such as heat exchanger.

17 Claims, 16 Drawing Sheets

(58) Field of Classification Search
CPC ..... F25B 2400/0419; F28F 3/02; F28F 3/046; F28F 2250/06; F28D 9/005
See application file for complete search history.

(56) References Cited

U.S. PATENT DOCUMENTS

| | | | |
|---|---|---|---|
| 4,605,060 A | | 8/1986 | Andersson et al. |
| 6,237,679 B1 | | 5/2001 | Vestergren |
| 8,857,504 B2 | * | 10/2014 | Christensen ............ F28D 9/005 |
| | | | 165/167 |
| 9,534,854 B2 | | 1/2017 | Romlund |
| 2008/0041096 A1 | | 2/2008 | Sakashita et al. |
| 2011/0108258 A1 | | 5/2011 | Magnier-Cathenod et al. |
| 2014/0260386 A1 | * | 9/2014 | Hatanaka ................ F25B 49/02 |
| | | | 62/196.1 |

FOREIGN PATENT DOCUMENTS

| | | |
|---|---|---|
| CN | 108731521 A | 11/2018 |
| EP | 0088316 A2 | 9/1983 |
| EP | 1630510 A1 | 3/2006 |
| EP | 3040670 A1 | 7/2016 |
| JP | S4833663 B | 10/1973 |
| JP | 2009030840 A | 2/2009 |
| SE | 321492 B | 3/1970 |
| WO | 2006114826 A1 | 11/2006 |
| WO | WO-2009062739 A1 * 5/2009 ............ F25B 39/022 |
| WO | 201501506 A | 1/2015 |
| WO | WO-2017029534 A1 * 2/2017 .............. F25B 13/00 |
| WO | 2018/215426 A1 | 11/2018 |
| WO | WO-2018215425 A1 * 11/2018 ............... F24H 4/00 |

OTHER PUBLICATIONS

PCT Written Opinion for PCT Application No. PCT/SE2021/050066 mailed Mar. 23, 2021 (8 pages).
Swedish Search Report for SE Application No. 2050093-0 mailed Sep. 4, 2020 (3 pages).
Swedish Office Action for SE Application No. 2050093-0 mailed Sep. 4, 2020 (6 pages).
Swedish Office Action for SE Application No. 2050093-0 mailed Jan. 21, 2022 (6 pages).

* cited by examiner

HEAT EXCHANGER AND REFRIGERATION SYSTEM AND METHOD

This application is a National Stage Application of PCT/SE2021/050066, filed 29 Jan. 2021, which claims benefit of Serial No. 2050093-0, filed 30 Jan. 2020 in Sweden, and which applications are hereby incorporated by reference in their entireties. To the extent appropriate, a claim of priority is made to each of the above disclosed applications.

FIELD OF THE INVENTION

The present invention relates to a brazed plate heat exchanger comprising a plurality of heat exchanger plates having a pattern of ridges and grooves providing contact points between at least some crossing ridges and grooves of neighboring plates under formation of interplate flow channels for fluids to exchange heat. The interplate flow channels are in selective fluid communication with four port openings for fluids to exchange heat. This type of heat exchangers also comprises two additional port openings for fluids to exchange heat to form a so called integrated suction gas heat exchanger, wherein a dividing surface divides the heat exchanger plates into a first heat exchanging portion and a second heat exchanging portion, so that the suction gas heat exchanger exchanges heat over the second heat exchanging portion.

The present invention is also related to a refrigeration system comprising at least one such heat exchanger. The present invention is also related to a refrigeration method using at least one such heat exchanger. Disclosed is also heat exchangers and refrigeration systems and methods.

PRIOR ART

A plurality of brazed plate heat exchangers with a pressed corrugated pattern having ridges and grooves in a herringbone pattern is known in the prior art. It is also known to provide heat exchangers with an integrated suction gas heat exchanger and to use such a heat exchanger in a refrigeration system.

In the refrigeration field, there is a constant strive towards more efficient systems. Actually, the best refrigeration systems approach the Carnot efficiency, which is the theoretical upper limit for a heat machine. Generally speaking, all refrigeration systems transforming mechanical energy to a temperature difference comprises a compressor, a condenser, an expansion valve, an evaporator, and piping enabling transport of refrigerant between the compressor, the condenser, the expansion valve and the evaporator, wherein heat is transferred from the evaporator to the condenser.

However, although the efficiency at some temperature differences may approach the Carnot efficiency, this is far from true for all running conditions.

In general terms, all heat exchangers comprised in a refrigeration system should be as large and efficient as possible. Also, they should have an as low hold-up volume as possible, and a low pressure drop. As could be understood, these criteria cannot all be met.

When it comes to the temperatures after the evaporator, every temperature increase over the temperature at which all refrigerant is evaporated (i.e. the highest boiling point of the refrigerant) will mean a loss in efficiency—however, since liquid refrigerant entering the compressor may seriously damage the compressor, it is also crucial that all refrigerant actually is vaporized before entering the compressor. A state where all the refrigerant is evaporated, although its temperature does not exceed the boiling temperature, is generally referred to as "zero superheat", and is a state being very beneficial in terms of efficiency.

One way of achieving "zero superheat" in the evaporator is to "flood" the evaporator with liquid refrigerant and let refrigerant boil off from the flooded evaporator. This configuration is common in large chiller applications, i.e. heat machines having a power of 500-1000 kW. Usually, so-called "plate and shell" or "shell and tube" heat exchangers are used for such applications.

As could be understood from the above, such evaporator configurations give great performance, but they are far from free from drawbacks: First, all heat exchangers comprising a shell are bulky and heavy, meaning that the material cost for manufacturing them are high. Secondly, and even more important, the refrigerant volume required for flooding the heat exchanger is large. Except from the cost issue, legislation often bans too large refrigerant amounts in a heat machine.

The by far most efficient heat exchanger type in terms of heat transfer/material mass is the compact brazed plate heat exchanger (BPHE). As known by persons skilled in the art, such heat exchangers comprise a number of plates made from sheet metal and provided with a pressed pattern of ridges and grooves adapted to keep the plates on a distance from one another under formation of interplate flow channels for the media to exchange heat. The plates are brazed to one another, meaning that each plate pair will be active in containing the refrigerant under pressure in the heat exchanger. Brazed plate heat exchangers have the benefit that virtually all material in the heat exchanger actually is active for heat exchange, unlike the heat exchangers comprising a shell, wherein the shell has the sole purpose of containing the refrigerant.

The evaporation processes in BPHEs and flooded shell and tube heat exchangers are very different—as mentioned, the evaporation in a flooded shell and tube heat exchanger resembles a pool boiling, whereas in a BPHE, the refrigerant will travel more or less linearly through the interplate flow channel. The closer to the exit, the less liquid refrigerant will be present. Due to the volumetric increase due to evaporation, the velocity and hence flow resistance will increase along the length of the heat exchanger.

As mentioned above, it is crucial that no liquid refrigerant enters the compressor. Therefore, it is not uncommon that at least some of the heat exchanger contains only gaseous refrigerant. The gaseous refrigerant will take up heat and become unnecessarily hot, which will decrease the system efficiency.

It is also beneficial if the liquid refrigerant about to enter the evaporator is cool, since flash boiling phenomena can be minimized if the refrigerant is cool.

One way of securing a low refrigerant temperature of the refrigerant about to enter the expansion valve (hence reducing risk of flash boiling), while securing a high enough temperature of the gaseous refrigerant about to enter the compressor is to use a so-called suction gas heat exchanger. In its simplest form, a suction gas heat exchanger may be arranged by simply placing the piping from the evaporator to the compressor in the vicinity of the piping from the condenser to the expansion valve close to one another and braze or solder them together, such that heat may be transferred between the pipings. For larger systems, however, it is more common to provide a more efficient heat exchanger than simply two pipes placed beside one another. Normally when using a larger type of suction gas heat exchanger the problem with evaporator outlet pressure drop and suction gas heat exchanger inlet/outlet pressure drop is destructive for the total efficiency and may cause a control problem for a system with same.

If the superheating of the refrigerant could be kept at a minimum while it is ensured that no liquid refrigerant enters the compressor, the BPHE could be competitive with the flooded shell and tube heat exchanger also in terms of efficiency, while retaining its benefits in terms of compactness and material efficiency.

In the art of refrigeration, so-called "suction gas heat exchange" is a way to improve e.g. stability of a refrigeration system. In short, suction gas heat exchange is achieved by providing for a heat exchange between warm liquid, high pressure refrigerant from a condenser outlet and cold gaseous refrigerant from an evaporator outlet. By the suction gas heat exchange, the temperature of the cold gaseous refrigerant will increase, while the temperature of the warm liquid will decrease. This has two positive effects: Firstly, problems with flash boiling after the warm liquid has passed a subsequent expansion valve will decrease; Secondly, the risk of droplets in the gaseous refrigerant leaving the evaporator will decrease.

Suction gas heat exchanging is well known. Often, suction gas heat exchange is achieved by simply brazing or soldering pipes carrying refrigerant in the states between which heat exchange is desired to one another. This way of achieving the heat exchange is, however, costly in terms of refrigerant volume required—it is always beneficial if the piping between different components of a refrigeration system is as short as possible. Suction gas heat exchange by brazing or soldering piping carrying fluids having different temperatures together necessitates longer piping than otherwise would be the case—hence, the internal volume of the piping will increase, requiring more refrigerant in the refrigeration system. This is detrimental not only from an economical point of view, but also since the amount of refrigerant is limited in several jurisdictions.

Another option is to provide a separate heat exchanger for the suction gas heat exchange. Separate heat exchangers are more efficient than simply brazing different piping portions to one another, but the provision of a separate heat exchanger also necessitates piping connecting the evaporator and the condenser to the suction gas heat exchanger, which piping will increase the refrigerant volume of the refrigeration system.

Moreover, refrigeration systems are often required to be able to operate in both heating mode and in chiller mode, depending on the required/desired load. Usually, the shift between heating and chilling mode is achieved by shifting a four-way valve such that an evaporator becomes a condenser and a condenser becomes an evaporator. Unfortunately, this means that the heat exchange in either or both the condenser/evaporator units will be a co-current heat exchange, i.e. a heat exchange wherein the media to exchange heat travels in the same general direction, in either heating or cooling mode. As well known by persons skilled in the art, a co-current heat exchange is inferior to a counter-current heat exchange. In evaporators, a decrease of heat exchanging performance might lead to an increased risk of droplets in the refrigerant vapor that leaves the heat exchanger. Such droplets might seriously damage a compressor and are thus highly undesirable. However, devices to shift the flow direction of the medium to exchange heat with the refrigerant in the evaporator are costly and add complexity to the refrigeration system.

It is the object of the present invention to solve or at least mitigate the above and other problems.

One object of the present invention is to provide a plate heat exchanger providing favorable fluid distribution and heat transfer between the fluids in a refrigeration system.

Another object of the present invention is to provide an efficient refrigeration system.

Yet another object of the present invention is to provide a BPHE and a refrigeration system where such a BPHE is used to achieve zero, or close to zero, superheat of refrigerant entering the compressor.

SUMMARY OF THE INVENTION

According to a first aspect of the invention, some of the above objects are achieved by a refrigeration system comprising a compressor for compressing a gaseous refrigerant, such that the temperature and pressure thereof increases, wherein the boiling point thereof increases; a condenser, in which the gaseous refrigerant from the compressor exchanges heat with a high temperature heat carrier, said heat exchange resulting in the refrigerant condensing; an expansion valve reducing the pressure of liquid refrigerant from the condenser, hence reducing the boiling point of the refrigerant; an evaporator, in which the low boiling point refrigerant exchanges heat with a low temperature heat carrier, such that the refrigerant vaporizes; and a suction gas heat exchanger exchanging heat between high temperature liquid refrigerant from the condenser and low temperature gaseous refrigerant from the evaporator, characterised by a balance valve arranged to enable bypassing the high temperature liquid refrigerant such that it does not exchange heat with the low temperature gaseous refrigerant from the evaporator in the suction gas heat exchanger.

The invention also relates to a method for controlling such a system comprising the steps of
a) measuring a temperature of the high temperature liquid refrigerant,
b) measuring a temperature of the low temperature gaseous refrigerant,
c) calculating a temperature difference between the high temperature liquid refrigerant and the low temperature gaseous refrigerant, and
d) controlling the balance valve to bypass the suction gas heat exchanger should the difference be less than a predetermined threshold value.

For example, the threshold value can be zero.

According to a second aspect of the invention, some of the above objects are achieved by a refrigeration system comprising a compressor for compressing a gaseous refrigerant, such that the temperature and pressure thereof increases, wherein the boiling point thereof increases; a condenser, in which the gaseous refrigerant from the compressor exchanges heat with a high temperature heat carrier, said heat exchange resulting in the refrigerant condensing; an expansion valve reducing the pressure of liquid refrigerant from the condenser, hence reducing the boiling point of the refrigerant; an evaporator, in which the low boiling point refrigerant exchanges heat with a low temperature heat carrier, such that the refrigerant vaporizes; and a suction gas heat exchanger exchanging heat between high temperature liquid refrigerant from the condenser and low temperature gaseous refrigerant from the evaporator, characterised in that the low temperature gaseous refrigerant entering the suction gas heat exchanger contains a certain amount of low temperature liquid refrigerant, said low temperature liquid refrigerant vaporizing as a result of the heat exchange with the high temperature liquid refrigerant from the condenser.

According to a third aspect of the invention, some of the above objects are achieved by a plate heat exchanger comprising a plurality of heat exchanger plates provided with a pressed pattern adapted to provide contact points keeping the heat exchanger plates on a distance from one another such that interplate flow channels are formed between said plates, said heat exchanger being provided with interplate flow channels for a first medium exchanging heat with a second medium in interplate flow channels and a third medium in interplate flow channels, wherein the interplate flow channels are in selective fluid communication with port openings for the first medium, the second medium and the third medium, characterised by first and second integrated suction gas heat exchanger sections provided in the vicinity of port openings for the second medium and third medium.

According to a fourth aspect of the invention, some of the above objects are achieved by a brazed plate heat exchanger comprising a plurality of first and second heat exchanger plates, wherein the first heat exchanger plates are formed with a first pattern of ridges and grooves, and the second heat exchanger plates are formed with a second pattern of ridges and grooves providing contact points between at least some crossing ridges and grooves of neighbouring plates under formation of interplate flow channels for fluids to exchange heat, said interplate flow channels being in selective fluid communication with first, second, third and fourth large port openings and first and second small port openings, wherein the first and second heat exchanger plates are formed with a dividing surface dividing the heat exchanger plates into a first heat exchanging portion and a second heat exchanging portion, so that fluid passing between the first and second large port openings exchanges heat with fluid passing between the third and fourth port openings over the first heat exchanging portion of each plate and fluid passing between the first and second small port openings over the second heat exchanging portion of each plate, characterised in that the ridges and grooves are formed such that the interplate flow channels between different plate pairs have different volumes. Optionally the first pattern at least partially exhibits a first angle, such as a first chevron angle, and the second pattern at least partially exhibits a second angle, such as a second chevron angle, different from the first angle.

The small port openings and the dividing surface results in an integrated suction gas heat exchanger and together with the combination of at least two different plate patterns having different interplate flow channel volumes result in a BPHE with favourable properties, such as for a refrigeration system. By the combination of the optional different chevron angles and the different interplate flow channel volumes the fluid flow distribution and pressure drop can be balanced to achieve efficient heat exchange, which has been found particularly favourable for refrigeration. Such a BPHE has been found to result in practically zero, or close to zero, superheat of refrigerant entering a compressor in a refrigerant system. The evaporation is with almost zero superheat and the superheat is added outside the evaporation against a water side (secondary side) the superheat and carry over is added and the carry over droplets are evaporated during suction gas heat exchange process resulting in a superheat not affecting the evaporation process by decreasing the heat transfer in the heat exchanger with gas towards water/brine which will occur when adding super heat in a standard heat exchanger. This results in the possibility to use co current and reach close temperature approach.

The invention is also related to a refrigeration system comprising such a plate heat exchanger and a refrigeration method.

According to a fifth aspect of the invention, some of the above objects are achieved by a brazed plate heat exchanger comprising a plurality of first and second heat exchanger plates, wherein the first heat exchanger plates are formed with a first pattern of ridges and grooves, and the second heat exchanger plates are formed with a second pattern of ridges and grooves providing contact points between at least some crossing ridges and grooves of neighbouring plates under formation of interplate flow channels for fluids to exchange heat, said interplate flow channels being in selective fluid communication through port openings, characterised in that the first pattern of ridges and grooves is different from the second pattern of ridges and grooves, so that an interplate flow channel volume on one side of the first heat exchanger plates are different from the interplate flow channel volume on the opposite side of the first heat exchanger plates, and the first pattern of ridges and grooves exhibits a first angle and the second pattern of ridges and grooves exhibits a second angle different from the first angle.

The combination of different interplate flow channel volumes on opposite sides of the plates and at least two different plate patterns having different angles result in a BPHE with favourable properties for fluid distribution, wherein the fluid flow distribution and pressure drop can be balanced to achieve efficient heat exchange. This makes it possible to achieve different properties in interplate flow channels on opposite sides of the same plate, wherein the flow and pressure drop on one side can be different from the opposite side. Also, the different flow channel volumes on opposite sides of the plates can be used for different types of medias, such as a liquid in one and a gas in the other. Also, the combination of different interplate flow channel volumes in neighbouring interplate flow channels and at least two different plate patterns having different angles result in different brazing joint shapes, such as a width of the brazing joints in relation to meda flow direction, for controlling flow of media and pressure drop.

When a refrigerant start to evaporate it is transferred from a liquid state to a vapour state. The liquid has a density that is much higher than the vapour density. For example R410A at Tdew=5° C. has 32 times higher density for the liquid than the vapour. This also mean that the vapour will move in a channel at velocities that are 32 times higher than the liquid. This will automatically lead to the dynamic pressure drop for the vapour being 32 times higher than for the liquid, i.e. vapour creates much higher pressure drop for all kind of refrigerants.

The performance (Temperature Approach, TA) of a heat exchanger is defined as the water outlet temperature (at the inlet of the heat exchanger channel) minus the evaporation temperature (Tdew) at the outlet of the heat exchanger channel. A high pressure drop along the heat exchanger surface results in different local saturation temperatures that will result in a relatively large total difference in refrigerant temperature between the inlet and outlet of the channel. The temperature will be higher at the inlet of the channel. This will have a direct, detrimental impact on the performance of the heat exchanger, since a higher inlet refrigerant temperature (due to too high channel pressure drop) makes it harder to cool the outlet water to the correct temperature. The only way for the system to compensate for the too high refrigerant inlet temperature is by lowering the evaporation temperature until correct water outlet temperature can be reached. By creating pattern for heat exchanger channels that have high heat transfer characteristics and at the same time have low pressure drop characteristics, a higher performance can be reached for the heat exchanger. A lower overall refrigerant pressure drop in the channel will not only improve the heat exchanger performance it will also have a positive impact on the total system performance and, hence, the energy consumption.

Disclosed is also the use of a brazed plate heat exchanger with different interplate flow channel volumes and different angles, with or without suction gas heat exchangers, for evaporation or condensation of media.

According to a sixth aspect of the invention, some of the above objects are achieved by a brazed plate heat exchanger comprising a plurality of first and second heat exchanger plates, wherein the first heat exchanger plates are formed with a first pattern of ridges and grooves, and the second heat exchanger plates are formed with a second pattern of ridges and grooves providing contact points between at least some crossing ridges and grooves of neighbouring plates under formation of interplate flow channels for fluids to exchange heat, said interplate flow channels being in selective fluid communication port openings, characterised in that the first pattern of ridges and grooves is different from the second pattern of ridges and grooves, so that an interplate flow channel volume on one side of the first heat exchanger plates is different from the interplate flow channel volume on the opposite side of the first heat exchanger plates. Optionally, the first pattern exhibits a first angle and the second pattern exhibits a second angle different from the first angle. The heat exchanger is provided with a retrofit port heat exchanger.

The invention is also related to a refrigeration system and a refrigeration method having such a heat exchanger with two or more different plates having different patterns and provided with a retrofit port heat exchanger.

BRIEF DESCRIPTION OF THE DRAWINGS

In the following, the invention will be described with reference to appended drawings, wherein.

DESCRIPTION OF EMBODIMENTS

Figure 1:
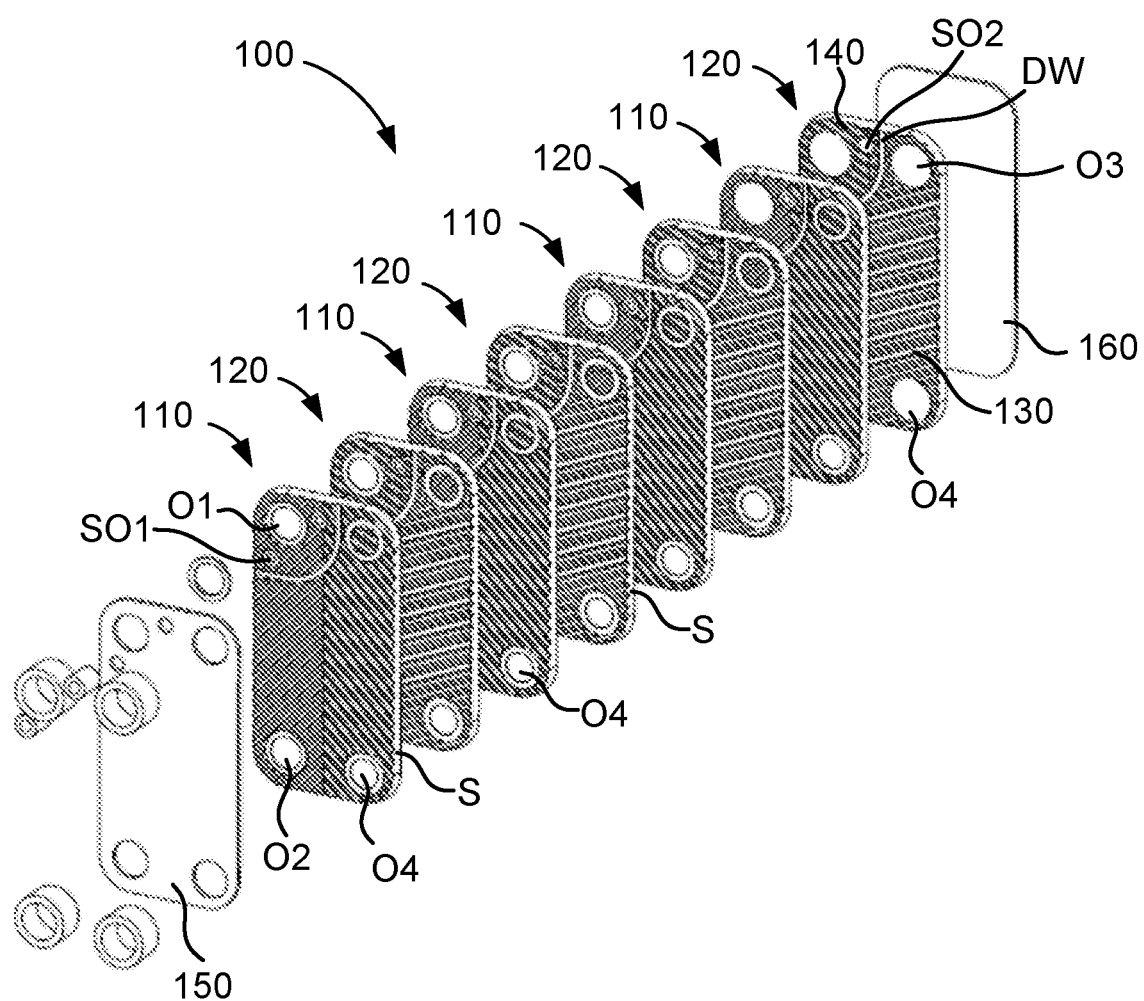
FIG. 1 is an exploded perspective view of a heat exchanger according to one embodiment of the present invention.
Figure 2:
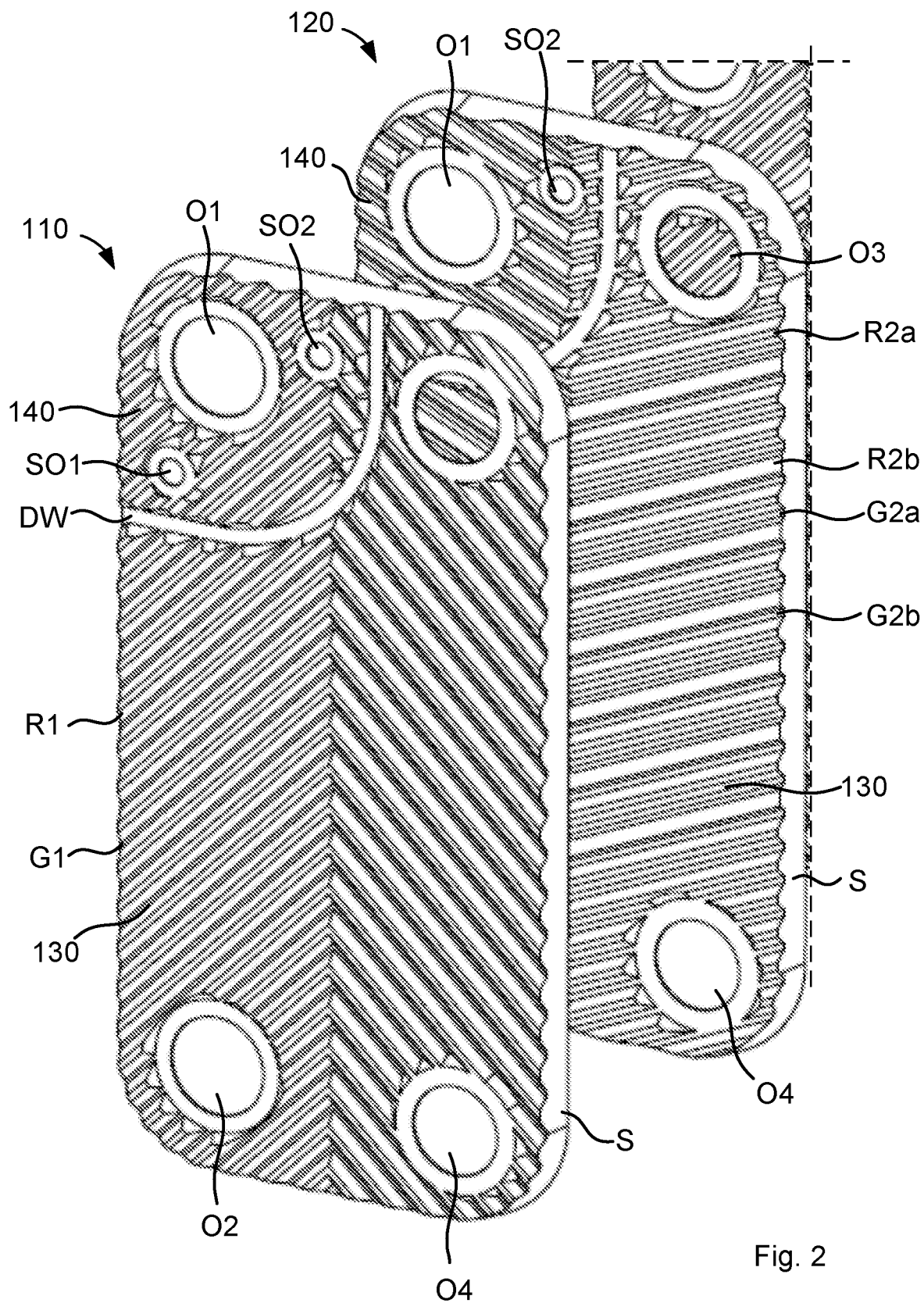
FIG. 2 is an exploded perspective view of a part of the heat exchanger of FIG. 1, illustrating a first heat exchanger plate and a second heat exchanger plate of the heat exchanger.

With reference to FIG. 1 a brazed plate heat exchanger 100 is illustrated according to one embodiment, wherein a part thereof is illustrated more in detail in FIG. 2. The heat exchanger 100 comprises a plurality of first heat exchanger plates 110 and a plurality of second heat exchanger plates 120 stacked in a stack to form the heat exchanger 100. The first and second heat exchanger plates 110, 120 are arranged alternatingly, wherein every other plate is a first heat exchanger plate 110 and every other plate is a second heat exchanger plate 120. Alternatively, the first and second heat exchanger plates are arranged in another configuration together with additional heat exchanger plates. The heat exchanger 100 is an asymmetric plate heat exchanger.

The heat exchanger plates 110, 120 are made from sheet metal and are provided with a pressed pattern of ridges R1, R2a, R2b and grooves G1, G2a, G2b such that interplate flow channels for fluids to exchange heat are formed between the plates when the plates are stacked in a stack to form the heat exchanger 100 by providing contact points between at least some crossing ridges and grooves of neighbouring plates 110, 120 under formation of the interplate flow channels for fluids to exchange heat. The pressed pattern of FIGS. 1 and 2 is a herringbone pattern. However, the pressed pattern may also be in the form of obliquely extending straight lines. In any case, the pressed pattern of ridges and grooves is a corrugated pattern. The pressed pattern is adapted to keep the plates 110, 120 on a distance from one another, except from the contact points.

In the illustrated embodiment, each of the heat exchanger plates 110, 120 is surrounded by a skirt S, which extends generally perpendicular to a plane of the heat exchanger plate and is adapted to contact skirts of neighbouring plates in order to provide a seal along the circumference of the heat exchanger 100.

The heat exchanger plates 110, 120 are arranged with large port openings O1-O4 and small port openings SO1, SO2 for letting fluids to exchange heat into and out of the interplate flow channels. In the illustrated embodiment, the heat exchanger plates 110, 120 are arranged with a first large port opening O1, a second large port opening O2, a third large port opening O3 and a fourth large port opening O4. Further, the heat exchanger plates 110, 120 are arranged with a first small port opening SO1 and a second small port opening SO2. Areas surrounding the large port openings O1 to O4 are provided at different heights such that selective communication between the large port openings and the interplate flow channels is achieved. In the heat exchanger 100, the areas surrounding the large port openings O1-O4 are arranged such that the first and second large port openings O1 and O2 are in fluid communication with one another through some interplate flow channels, whereas the third and fourth large port openings O3 and O4 are in fluid communication with one another by neighboring interplate flow channels. In the illustrated embodiment, the heat exchanger plates 110, 120 are rectangular with rounded corners, wherein the large port openings O1-O4 are arranged near the corners. Alternatively, the heat exchanger plates 110, 120 are square, e.g. with rounded corners. Alternatively, the heat exchanger plates 110, 120 are circular, oval or arranged with other suitable shape, wherein the large port openings O1-O4 are distributed in a suitable manner. In the illustrated embodiment, each of the heat exchanger plates 110, 120 is formed with four large port openings O1-O4. In other embodiments of the invention, as described below, the number of large port openings may be larger than four, i.e. six, eight or ten. For example, the number of large port openings is at least six, wherein the heat exchanger is configured for providing heat exchange between at least three fluids. Hence, according to one embodiment, the heat exchanger is a three circuit heat exchanger having at least six large port openings and in addition being arranged with or without at least one integrated suction gas heat exchanger.

In the illustrated embodiment, each of the heat exchanger plates 110, 120 is formed with two small port openings SO1, SO2. The small port openings SO1, SO2 are arranged to provide an integrated suction gas heat exchanger. Hence, the first and second heat exchanger plates 110, 120 are formed with a dividing surface DW dividing the heat exchanger plates 110, 120 into a first heat exchanging portion 130 and a second heat exchanging portion 140, so that fluid passing between the first and second large port openings O1, O2 exchanges heat with fluids passing between third and fourth port openings O3, O4 over the first heat exchanging portion 130 of each plate 110, 120 and fluid passing between the first and second small port openings SO1, SO2 over the second heat exchanging portion 140 of each plate 110, 120.

The dividing surface DW is provided to divide the heat exchange area into the first heat exchanging portion 130 and the second heat exchanging portion 140. For example, the dividing surface DW is arranged between one long side of the heat exchanger plates 110, 120 and a neighbouring short side thereof. For example, the dividing surface DW extends all the way from the long side to the short side. Alternatively, the dividing surface DW is arranged between two long sides, and e.g. extends all the way from one long side to the other. In the illustrated embodiment, the dividing surface DW is curved between the long side and the short side of the plate. Alternatively, the dividing surface DW is straight or formed with a corner.

The dividing surface DW comprises an elongate flat surface provided on different heights of different plates 110, 120. When the flat surfaces of neighbouring plates 110, 120 contact one another to form the dividing surface DW, the interplate flow channel will be sealed, whereas it will be open if they do not. In the present case, the dividing surface DW is provided at the same height as the areas surrounding the first and second large port openings O1 and O2, meaning that for interplate flow channels fluidly connecting the first and second large port openings O1 and O2, the dividing surface DW will be open, whereas for the interplate flow channel fluidly connecting the third and fourth large port openings O3 and O4, the dividing surface DW will block fluid in this interplate flow channel.

Since the dividing surface DW will block fluid flow in the interplate flow channel communicating with the third and fourth large port openings O3 and O4, there will be separate interplate flow channels on either side of the dividing surface DW. The interplate flow channel on the side of the dividing surface DW not communicating with the third and fourth large port openings O3 and O4 communicates with the two small port openings SO1 and SO2. It should be noted that the dividing surface DW does not block the interplate flow channels communicating with the first and second large port openings O1 and O2; hence, medium flowing in the interplate flow channels communicating with the small port openings SO1 and SO2 will exchange heat with medium flowing in the flow channels communicating with the first and second large port openings O1 and O2—just like medium flowing in the interplate flow channels communicating with the third and fourth large port openings O3 and O4.

In the embodiment shown in FIGS. 1 and 2, the dividing surface DW extends between the first large port opening O1 and the third large port opening O3. The small openings SO1 and SO2 are situated on either sides of the first large port opening O1. It should be noted that the first large port opening O1 is placed such that medium flowing in the interplate flow channel communicating with the small port openings SO1 and SO2 may pass on both sides of the first large port opening O1. The dividing surface DW extends between the first large port opening O1 and the remaining large port openings O2-O4, wherein the first and second small openings SO1, SO2 are on the same side of the dividing surface DW as the first large port opening O1, i.e.

in the second heat exchanging portion 140, and the other large port openings O2-O4 are arranged on the other side of the dividing surface DW, i.e. outside the dividing wall DW and in the first heat exchanging portion 130.

In the illustrated embodiment, the heat exchanger 100 comprises only the first and second heat exchanger plates 110, 120. Alternatively, the heat exchanger 100 comprises a third and optionally also a fourth heat exchanger plate, wherein the third and optional fourth heat exchanger plates are arranged with different pressed patterns than the first and second heat exchanger plates 110, 120, and wherein the heat exchanger plates are arranged in a suitable order.

In the illustrated embodiment, the heat exchanger 100 also comprises a start plate 150 and an end plate 160. The start plate 150 is formed with openings corresponding to the large port openings O1-O4 and the small port openings SO1, SO2 for letting fluids into and out of the interplate flow channels formed by the first and second heat exchanger plates 110, 120. For example, the end plate 160 is a conventional end plate.

Figure 3:
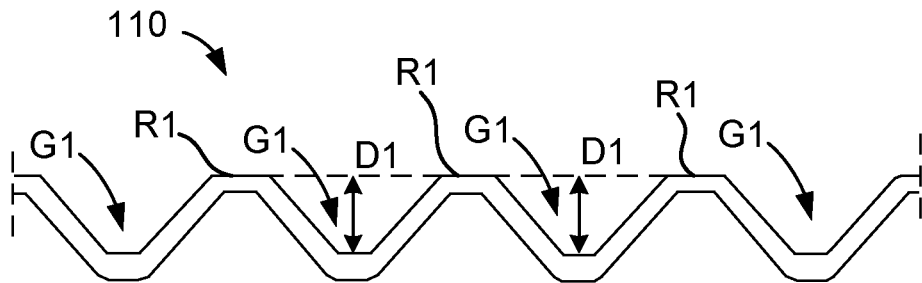
FIG. 3 is a schematic section view of another part of the first heat exchanger plate according to one embodiment, illustrating identical depth of grooves of the first heat exchanger plate.

With reference to FIG. 3, a section view of the first heat exchanger plate 110 according to one embodiment is illustrated schematically. The first heat exchanger plates 110 are formed with a first pattern of ridges R1 and grooves G1. The grooves G1 of the first heat exchanger plates are formed with identical depth D1, which is illustrated schematically in FIG. 3. Hence, all grooves G1 are formed with the same depth D1. For example, the depth D1 is 0.5-5 mm, such as 0.6-3 mm or 0.8-3 mm. For example, all ridges R1 are formed with the same height in a corresponding manner. In other words, the corrugation depth of the first heat exchanger plates 110 is symmetrical and similar throughout the plate or at least substantially throughout the plate. According to one embodiment, at least the first heat exchanging portion 130 of the first heat exchanger plate 110, such as the entire first heat exchanging portion 130 thereof, is formed with identical corrugation depth, wherein each of the grooves G1 is formed with the depth D1. For example, the first heat exchanging portion 130 and the second heat exchanging portion 140 of the first heat exchanger plate 110, such as the entire first heat exchanging portion 130 and the entire second heat exchanging portion, is formed with identical corrugation depth, wherein each of the grooves G1 is formed with the depth D1.

Figure 4:
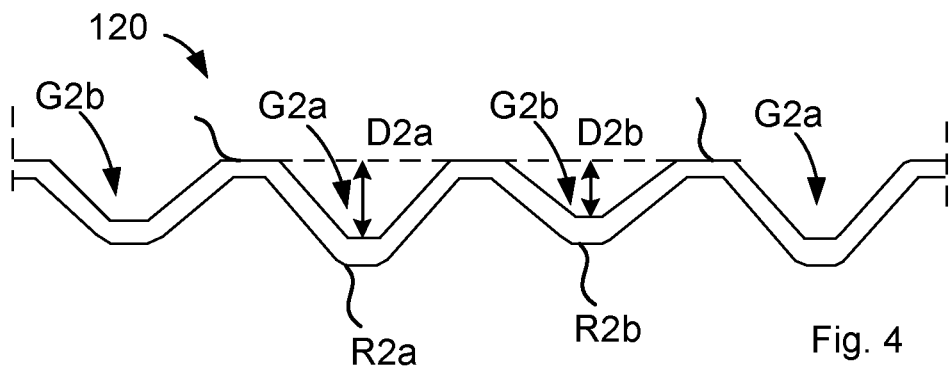
FIG. 4 is a schematic section view of a part of the second heat exchanger plate according to one embodiment, illustrating an alternating depth of grooves of the second heat exchanger plate.

With reference to FIG. 4, a section view of the second heat exchanger plate 120 is illustrated schematically according to one embodiment. For example, all second heat exchanger plates 120 are identical. The second heat exchanger plates 120 are formed with a second pattern of first and second ridges R2a, R2b and first and second grooves G2a, G2b. The first and second grooves G2a, G2b of the second heat exchanger plates 120 are formed with different depths, wherein the first grooves G2a are formed with a first depth D2a, and the second grooves G2b are formed with a second depth D2b, wherein the second depth D2b is different from the first depth D2a. For example, the first depth D2a is 0.5-5 mm, such as 0.6-3 mm or 0.8-3 mm, wherein the second depth D2b is 30-80% of the first depth D2a, such as 40-60% thereof. The ridges R2a, R2b have different heights in a corresponding manner. In the illustrated embodiment, the first depth D2a is larger than the second depth D2b. The first and second grooves G2a, G2b are arranged alternatingly. Alternatively, the first and second grooves G2a, G2b, and optionally further grooves having other depths, are arranged in any desired pattern.

For example, the pattern of ridges and grooves of the second heat exchanger plates 120 is asymmetrical, i.e. the second heat exchanger plates 120 forms an asymmetric heat exchanger when combined with first heat exchanger plates 110 such as shown below with reference to FIG. 5. According to one embodiment, at least the first heat exchanging portion 130 of the second heat exchanger plate 120, such as the entire first heat exchanging portion 130 thereof, is formed with the second pattern of ridges and grooves having at least two different corrugation depths D2a, D2b of the grooves. For example, the first heat exchanging portion 130 and the second heat exchanging portion 140 of the first heat exchanger plate 110, such as the entire first heat exchanging portion 130 and the entire second heat exchanging portion, is formed with at least two corrugation depths, wherein the first grooves G2a are formed with the first depth D2a, and the second grooves G2b are formed with the second depth D2b.

Figure 5:
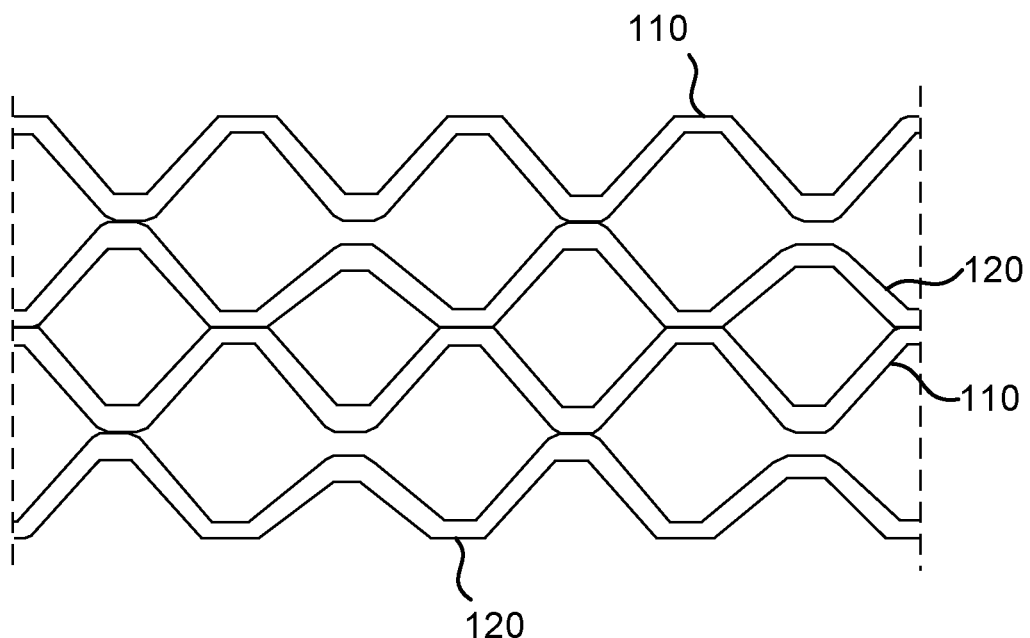
FIG. 5 is a schematic section view of a part of a heat exchanger comprising first and second heat exchanger plates according to one embodiment, wherein the first and second heat exchanger plates are alternatingly arranged.

With reference to FIG. 5 a plurality of the first and second heat exchanger plates 110, 120 have been stacked to schematically illustrate formation of interplate flow channels according to one embodiment. In the illustrated embodiment, every other plate is a first heat exchanger plate 110 and the remaining plates are second heat exchanger plates 120, wherein the first and second heat exchanger plates are arranged alternatingly to form an asymmetric heat exchanger 100, wherein the interplate flow channels are formed with different volumes. Alternatively, the different volumes of the interplate flow channels are formed by an extended profile on the same press depth or corrugation depth. For example, the first and second heat exchanger plates are provided with different corrugation depths. For example, the first and/or second heat exchanger plates is/are asymmetric heat exchanger plates. Alternatively, the first and/or second heat exchanger plates is/are symmetric heat exchanger plates.

Figure 6A:
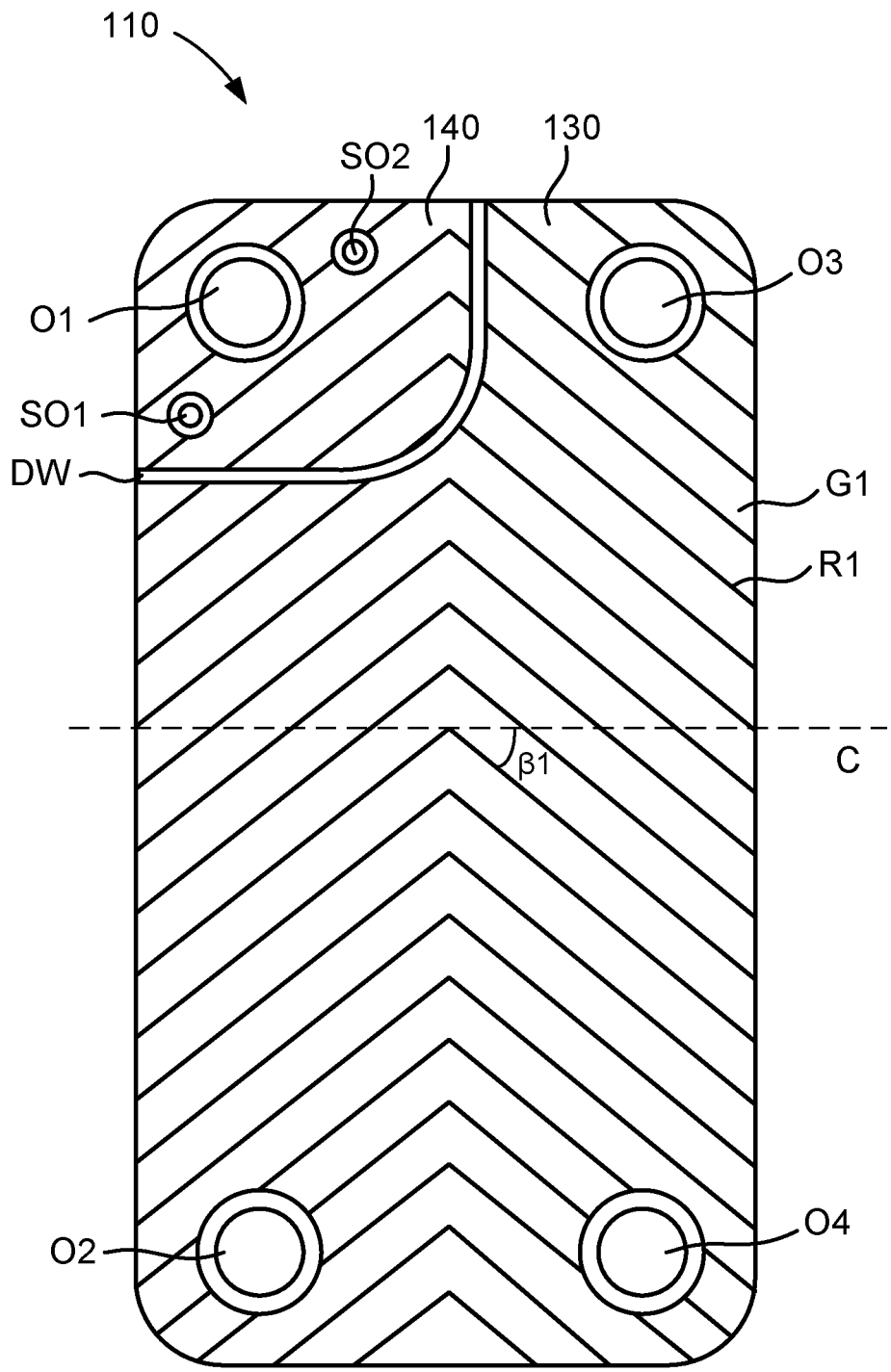
FIG. 6a is a schematic front view of the first heat exchanger plate according to one embodiment, illustrating a corrugated herringbone pattern thereof having a first chevron angle.

With reference to FIG. 6a the first pattern of ridges R1 and grooves G1 of the first heat exchanger plate 110 is illustrated schematically. Said pattern is a pressed herringbone pattern, wherein the ridges R1 and grooves G1 are arranged with two inclined legs meeting in an apex, such as a centrally arranged apex, to form an arrow shape. For example, the apices are distributed along an imaginary centre line, such as a longitudinal centre line of a rectangular heat exchanger plate. For example, the herringbone pattern is arranged so that ridges R and grooves G, at least in a central portion of the first heat exchanger plate 110, extend from one long side to the other of the first heat exchanger plate 110, e.g. with all the apices pointing towards one of the short sides. The pattern of the first heat exchanger plate 110, i.e. the first pattern of ridges R1 and grooves G1, exhibits a first chevron angle $\beta 1$. The chevron angle is the angle between the ridge and an imaginary line across the plate, perpendicular to the long sides of a rectangular plate, which is illustrated schematically by means of the dashed line C. Hence, the chevron angle is the angle between the ridge and a short side of the heat exchanger plate towards which the apex is pointing. The long sides of the heat exchanger plates extend perpendicular to the short sides and hence the pattern of ridges and grooves is also arranged so that the ridges have an angle to the long sides. For example, the chevron angle is the same on both sides of the apex. For example, the entire or substantially entire first pattern of ridges and grooves is formed with the first chevron angle $\beta 1$ throughout the plate or at least throughput the first heat exchanging portion 130, and for example also the second heat exchanging portion 140. For example, the first chevron angle $\beta 1$ is 25° to 70° or 30° to 45°.

Figure 6B:
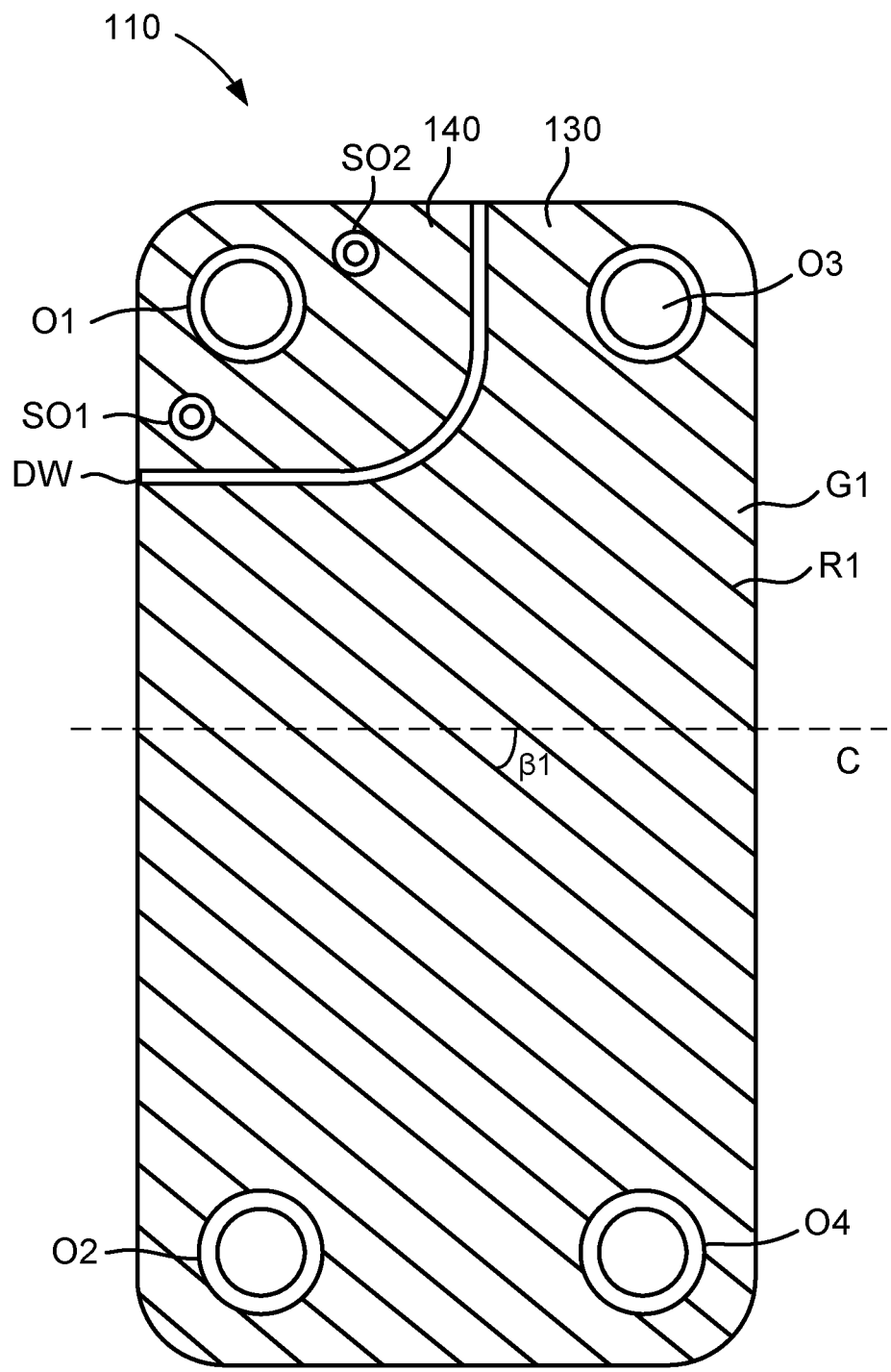
FIG. 6b is a schematic front view of the first heat exchanger plate according to an alternative embodiment, illustrating a corrugated pattern thereof having a first angle.

With reference to FIG. 6b the first pattern of ridges R1 and grooves G1 of the first heat exchanger plate 110 is illustrated schematically according to an alternative embodiment, wherein the pressed pattern is in the form of obliquely extending straight lines. Hence, the pressed pattern of ridges and grooves is a corrugated pattern of obliquely extending straight lines. The obliquely extending straight lines of the first heat exchanger plates 110 are arranged in the angle β1. For example, the pattern is arranged so that ridges R1 and grooves G1 extend, e.g. in parallel, from one long side to the other of the first heat exchanger plate 110.

Figure 7A:
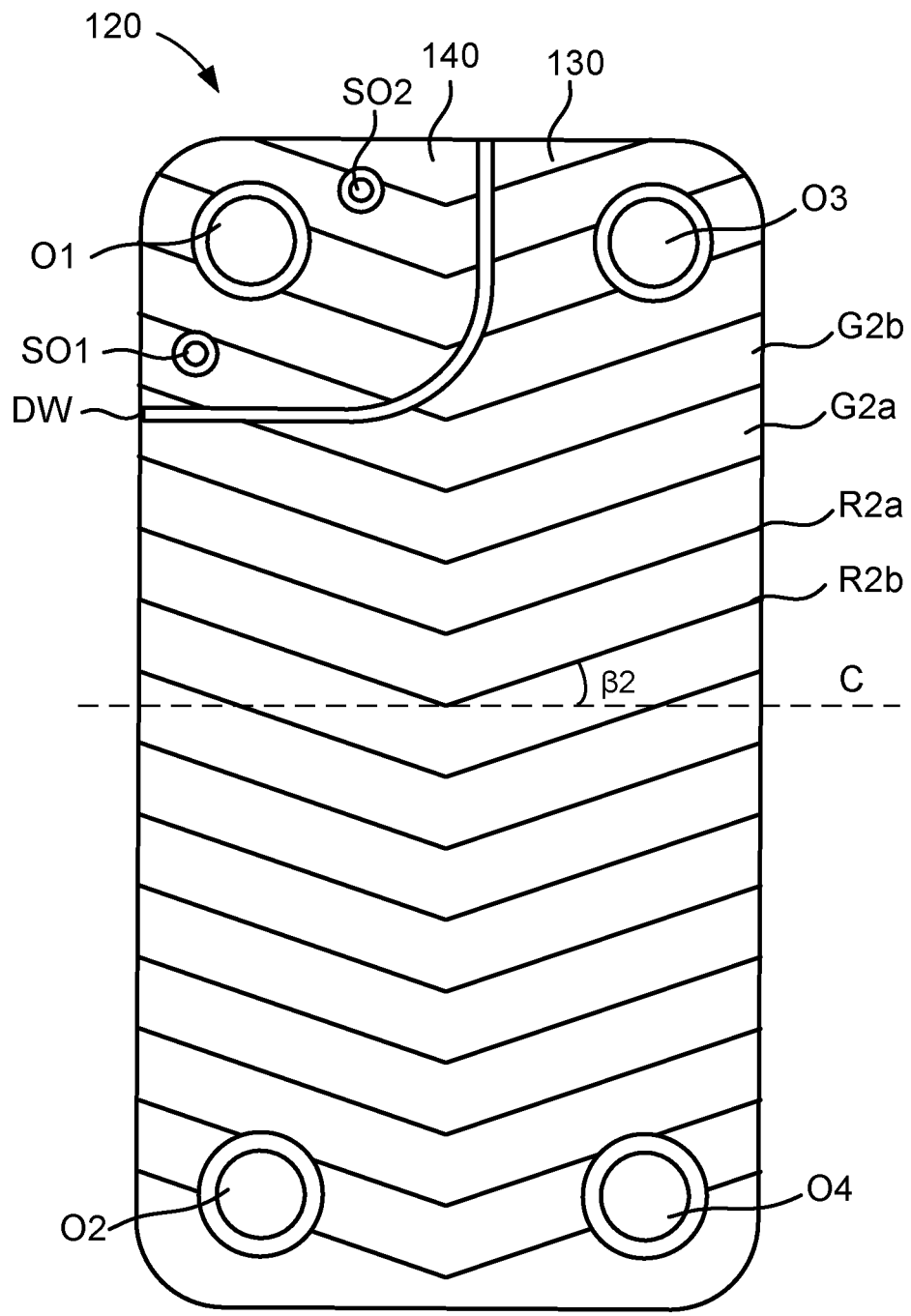
FIG. 7a is a schematic front view of the second heat exchanger plate according to one embodiment, illustrating a corrugated herringbone pattern thereof having a second chevron angle.

With reference to FIG. 7a the second pattern of ridges R2a, R2b and grooves G2a, G2b of the second heat exchanger plate 120 is illustrated schematically. Said second pattern is a pressed herringbone pattern as described above with reference to the first heat exchanger plate 110 but with a second chevron angle β2 different from the first chevron angle β1. Hence, the second heat exchanger plate 120 is arranged with a herringbone pattern having a different angle than the first heat exchanger plate. For example, the second chevron angle β2 is 0° to 90°, 25° to 70° or 30° to 45°. For example, the entire or substantially entire pattern of ridges and grooves of the second heat exchanger plates 120 is formed with the second chevron angle β2 throughout the plate or at least throughput the first heat exchanging portion 130, and for example also the second heat exchanging portion 140. For example, a difference between the first and second chevron angles β1 and β2 is 2° to 35°.

Figure 7B:
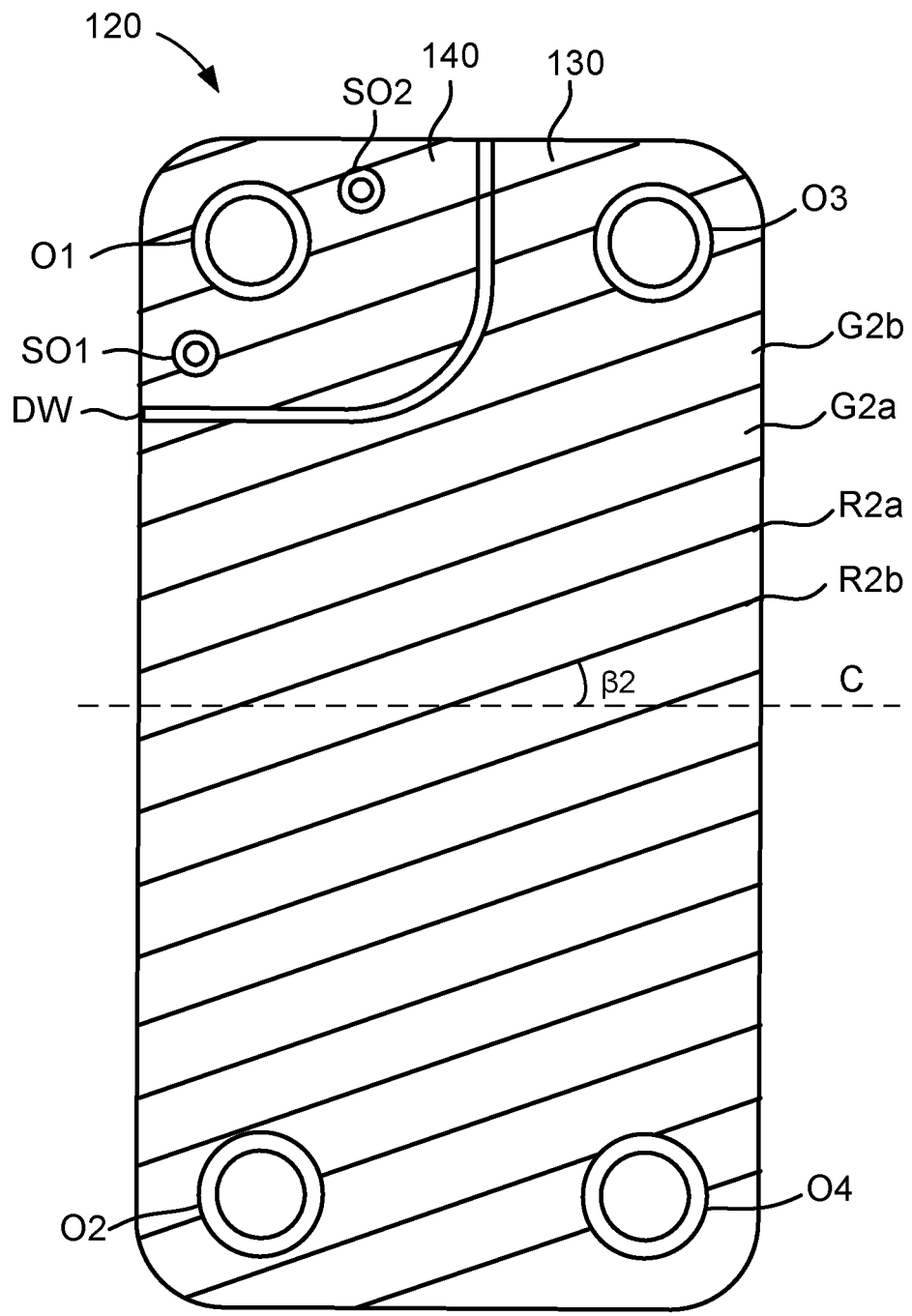
FIG. 7b is a schematic front view of the second heat exchanger plate according to an alternative embodiment, illustrating a corrugated pattern thereof having a second angle.

With reference to FIG. 7b the second pattern of ridges R2a, R2b and grooves G2a, G2b of the second heat exchanger plate 120 is illustrated schematically according to an alternative embodiment, wherein the pressed pattern is in the form of obliquely extending straight lines. Hence, the pressed pattern of ridges and grooves is a corrugated pattern of obliquely extending straight lines. The obliquely extending straight lines of the second heat exchanger plates 120 are arranged in the angle β2. For example, the pattern is arranged so that ridges R2a, R2b and grooves G2a, G2b extend, e.g. in parallel, from one long side to the other of the second heat exchanger plate 120.

Hence, the first and second heat exchanger plates 110, 120 are formed with different chevron angles β1, β2 and different pressed patterns resulting in different interplate volumes. For example, the first and second heat exchanger plates 110, 120 are provided with different corrugation depths. Alternatively or in addition, the first and second heat exchanger plates 110, 120 are provided with different corrugation frequencies. For example, the first and second heat exchanger plates 110, 120 are provided with the same corrugation depth but different corrugation frequencies. Hence, the first and second heat exchanger plates 110, 120 are provided with different corrugation depths and/or different corrugation frequencies. For example, one of the first and second heat exchanger plates 110, 120 is a symmetric heat exchanger plate, wherein the other is asymmetric. Alternatively, both the first and second heat exchanger plates 110, 120 are asymmetric. Alternatively, both the first and second heat exchanger plates 110, 120 are symmetric.

Figure 8:
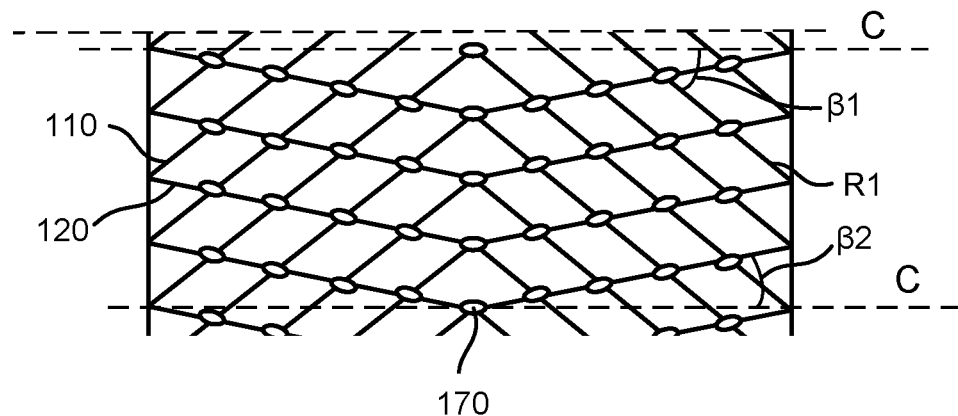
FIG. 8 is a schematic view of the first heat exchanger plate arranged on the second heat exchanger plate, illustrating contact points between them according to the example of FIG. 5.
Figure 9:
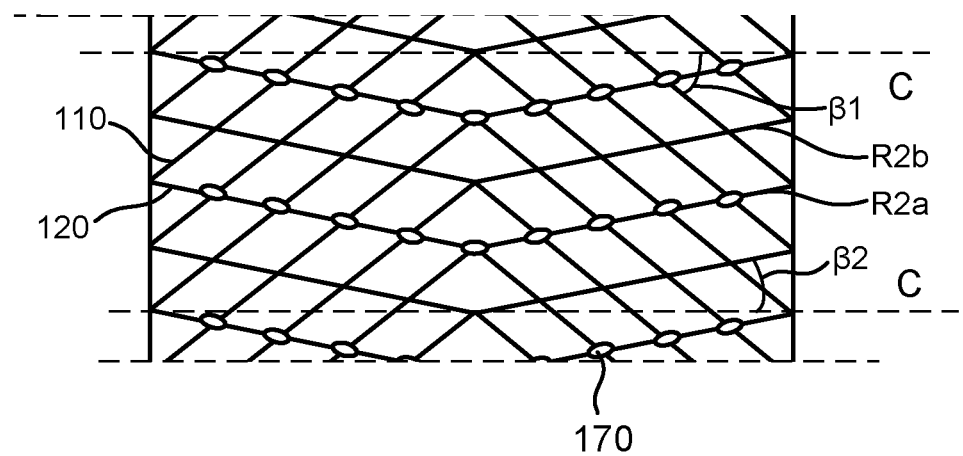
FIG. 9 is a schematic view of the second heat exchanger plate arranged on the first heat exchanger plate, illustrating contact points between them according to the example of FIG. 5.

In FIGS. 8 and 9 contact points between the first and second plates 110, 120 are illustrated schematically using the example of FIG. 5. In and/or around the contact points 170 between crossing ridges and grooves brazing joints 170 are formed. In the embodiment of FIGS. 8 and 9 brazing joints 170 are formed an all contact points. Alternatively, brazing joints 170 are formed in only some of the contact points. In FIG. 8 the first heat exchanger plate 110 is arranged on the second heat exchanger plate 120, wherein contact points are formed in a first pattern. In FIG. 8 all crossings between the ridges R1 of the first heat exchanger plate 110 and ridges or grooves of the second heat exchanger plate 120 result in a contact point.

FIG. 9 is a schematic view of the second heat exchanger plate 120 arranged on the first heat exchanger plate 110, wherein contact points are formed in a second pattern. In FIG. 9 only crossings between the first ridges R2a of the second heat exchanger plate 120 result in a contact point, which may form a brazing joint 170, wherein the second ridges R2b are arranged with a gap to the crossing ridges or grooves of the first heat exchanger plate 110. Hence, and no contact points are formed, and no brazing joint is formed, between the second ridges R2b of the second heat exchanger plate 120 and the first heat exchanger plate 110. In FIG. 9 all contact points are showed with a brazing joint 170.

According to one embodiment, the brazing joints 170 between the first and second heat exchanger plates 110, 120 are elongated, such as oval, wherein the brazing joints 170 are arranged in a first orientation in the interplate flow channels having bigger volume and in a second orientation in the interplate flow channels having smaller volume to provide a favourable pressure drop in the desired interplate flow channels. For example, the brazing joints 170 are arranged in a first angle in relation to a longitudinal direction of the plates 110, 120 in the interplate flow channels having bigger volume and in a second angle in the remaining interplate flow channels. According to one embodiment, the first angle is bigger than the second angle.

In FIGS. 10a, 10b and 11a, 11b, embodiments of a chiller system that can use a heat exchanger 100 according to any of the above heat exchanger embodiments is shown in in heating mode and cooling mode, respectively. Chiller system can also be called refrigeration system.

The chiller system according to the embodiments of FIGS. 10a, 10b, 11a, 11b comprises a compressor C, a four-way valve FWV, a payload heat exchanger PLHE connected to a brine system requiring heating or cooling, a first controllable expansion valve EXPV1, a first one-way valve OWV1, a dump heat exchanger DHE connected to a heat source to which undesired heat or cold could be dumped, a second expansion valve EXPV2 and a second one-way valve OWV2. The heat exchangers PLHE and DHE are each provided with the four large openings O1-O4 as disclosed above and the two small openings SO1 and SO2, wherein the large openings O1 and O2 of each heat exchanger communicate with one another, the large openings O3 and O4 of each heat exchanger communicate with one another and wherein the small openings SO1 and SO2 of each heat exchanger communicate with one another. Heat exchange will occur between fluids flowing from O1 to O2 and fluids flowing between O3 and O4 and SO1 and SO2. There will, however, be no heat exchange between fluids flowing from O3 to O4 and fluids flowing from SO1 to SO2. The payload heat exchanger PLHE and/or the dump heat exchanger DHE is/are a plate heat exchanger 100 as described herein.

Figure 10A:
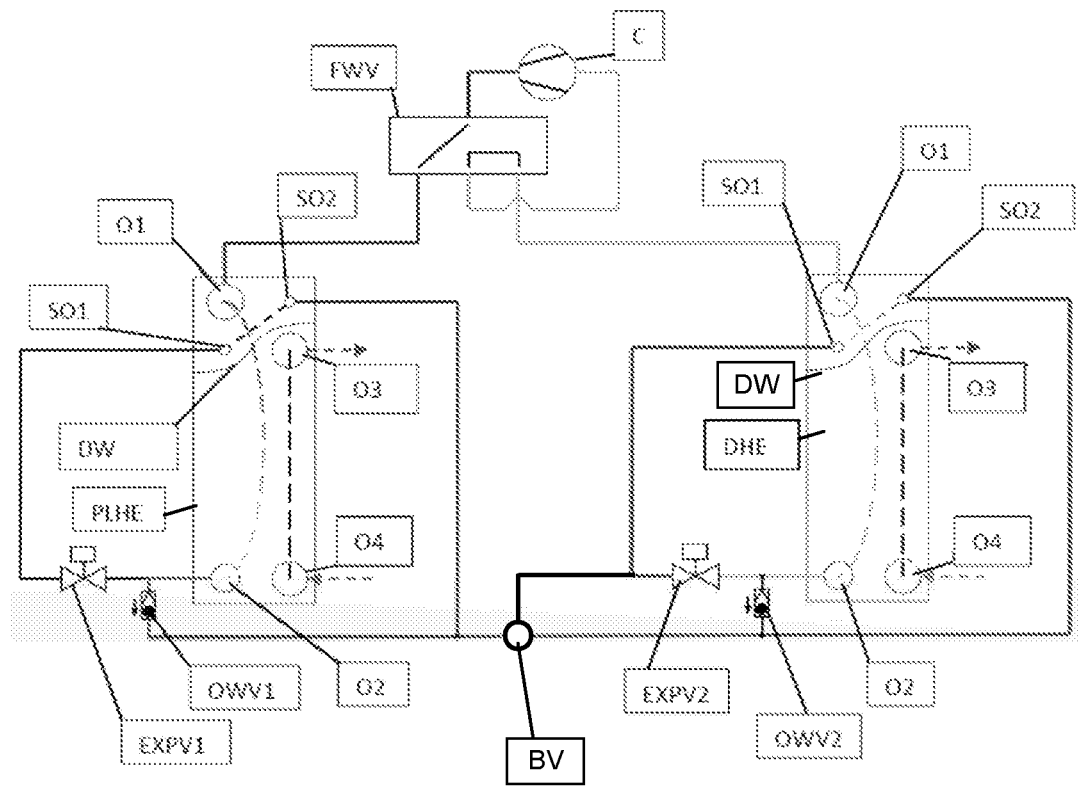
FIG. 10a is a schematic plan view showing a refrigeration system according to a first embodiment of the present invention in heating mode.
Figure 10B:
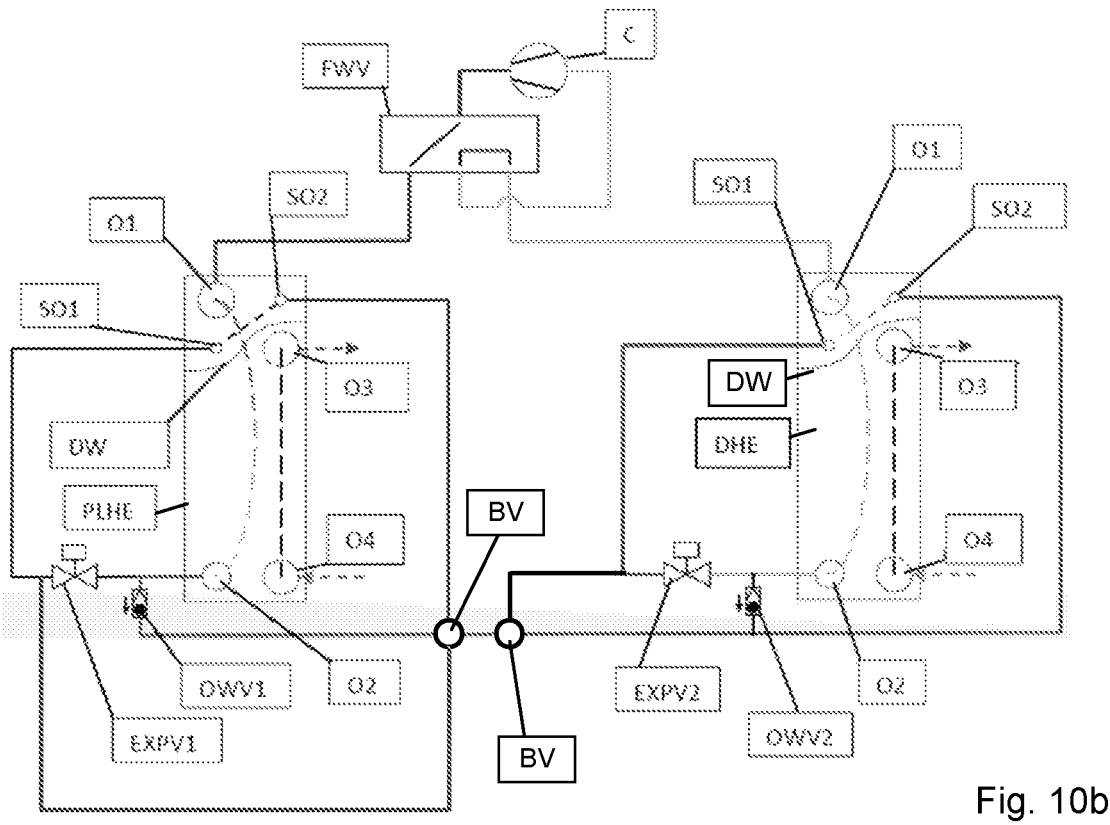
FIG. 10b is a schematic plan view showing a refrigeration system according to a second embodiment of the present invention in heating mode.

In heating mode, shown in FIGS. 10a and 10b, the compressor C will deliver high pressure gaseous refrigerant to the four-way valve FWV. In this heating mode, the four-way valve is controlled to convey the high pressure gaseous refrigerant to the large opening O1 of the payload heat exchanger PLHE. The high pressure, gaseous refrigerant will then pass the payload heat exchanger PLHE and exit at the large opening O2. While passing the pay-load heat exchanger PLHE, the high pressure gaseous refrigerant will exchanger heat with a brine solution connected to a pay-load requiring heating and flowing from the large opening O4 to the large opening O3, i.e. in a counterflow direction compared to the refrigerant, which flows from the large opening O1 to the large opening O2. While exchanging heat with the brine solution, the high pressure gaseous refrigerant will condense, and when exiting the Pay-load heat exchanger PLHE through the large opening O2, it will be fully condensed, i.e. be in the liquid state.

In the heating mode, the first expansion valve EXPV1 will be fully closed, and the flow of liquid refrigerant exiting the pay-load heat exchanger will pass the first one-way valve OWV1, which allows for a refrigerant flow in this direction, while it will block flow in the other direction (which will be explained later in connection to the description of the cooling mode).

After having passed the first one-way valve OWV1, the liquid refrigerant (still comparatively hot) will enter the small opening SO2 of the dump heat exchanger DHE and exit the heat exchanger through the small opening SO1. During the passage between the small openings SO and SO1, the temperature of the refrigerant will drop significantly due to heat exchange with cold, primarily gaseous refrigerant about to exit the dump heat exchanger DHE.

During e.g. a cold start, i.e. before the system has reached a favourable running condition, it might be necessary to balance the amount of heat exchange in the suction gas heat exchanger. This can be achieved by controlling a balance valve BV, the balance valve BV being e.g. a three-way valve arranged to enable control of liquid refrigerant from the condenser to either, or both, of the small opening SO2 and the expansion valve EXPV2, hence controlling the amount of heat exchange in the suction gas heat exchanger.

After leaving the dump heat exchanger DHE through the small opening SO1, the liquid refrigerant will pass the second expansion valve EXPV2, where the pressure of the refrigerant will drop, causing flash boiling of some of the refrigerant, which will cause the temperature to drop. From the second expansion valve, the refrigerant will pass a branch connected to both the second one-way valve OWV2, which is connected between the high pressure side and the low pressure side of the refrigerant circuitry and closed for refrigerant flow due to the pressure difference between the high pressure side and the low pressure side. After having passed the branch, the cold, low pressure semi liquid refrigerant will enter the large opening O2 and pass the dump heat exchanger DHE under heat exchange with a brine solution connected to a source from which low temperature heat can be collected, e.g. an outside air collector, a solar collector or a hole drilled in the ground. Due to the heat exchange with the brine solution, which flows from the large opening O4 to the large opening O3, the primarily liquid refrigerant will vaporize. The heat exchange between the brine solution and the refrigerant will take place under co-current conditions, which is well known to give an inferior heat exchange performance as compared to counter-current heat exchange.

Just prior to the exiting the dump heat exchanger DHE through the large opening O1, the refrigerant (now almost completely vaporized) will exchange heat with the comparatively hot, liquid refrigerant that entered the dump heat exchanger through the small opening SO2 and exited the dump heat exchanger through the small port opening SO1. According to one embodiment of the invention, about 85-98, preferably 90-95 and more preferably 91-94, e.g. 93 percent of the refrigerant is vaporized when it starts exchange heat with the hot liquid refrigerant.

Consequently, the temperature of the refrigerant about to exit the dump heat exchanger DHE through the opening O1 will increase, hence ensuring that all of this refrigerant is completely vaporized.

Hence, the low temperature gaseous refrigerant entering the suction gas heat exchanger contains a certain amount of low temperature liquid refrigerant, said low temperature liquid refrigerant vaporizing as a result of the heat exchange with the high temperature liquid refrigerant from the condenser. For example, said certain amount of low temperature liquid refrigerant amounts to 2-15, preferably 5-10, more preferably 6-9 and for example 7 percent by mass.

It is well known by persons skilled in the art that co-current heat exchange is inferior to counter-current heat exchange when it comes to the heat exchange performance. However, due to the provision of the heat exchange between the relatively hot liquid brine entering the small opening SO2 and the mainly gaseous refrigerant about to leave the dump heat exchanger DHE (i.e. a so-called "suction gas heat exchange"), it is not necessary to vaporize the refrigerant completely during the brine-refrigerant heat exchange. Instead, the refrigerant may be only semi-vaporized when it enters the suction gas heat exchange with the hot liquid refrigerant, since the remaining liquid phase refrigerant will evaporate during this heat exchange. It is well known that liquid-to-liquid heat exchange is much more efficient than gas-to-liquid heat exchange. Also, co-current heat exchange has the additional benefit that the risk of freezing is reduced, since the refrigerant enters the heat exchanger on a position where the medium with which the refrigerant shall exchange heat has a high temperature, hence reducing the risk of freezing at this position, which is the most critical position for freezing.

Tests have shown that there might be a problem with cold-starting the chiller system in cold environments.

From the opening O1 of the dump heat exchanger, the gaseous refrigerant will enter the four-way valve FWV, which is controlled to direct the flow of gaseous refrigerant to the compressor, in which the refrigerant is compressed again.

Figure 11A:
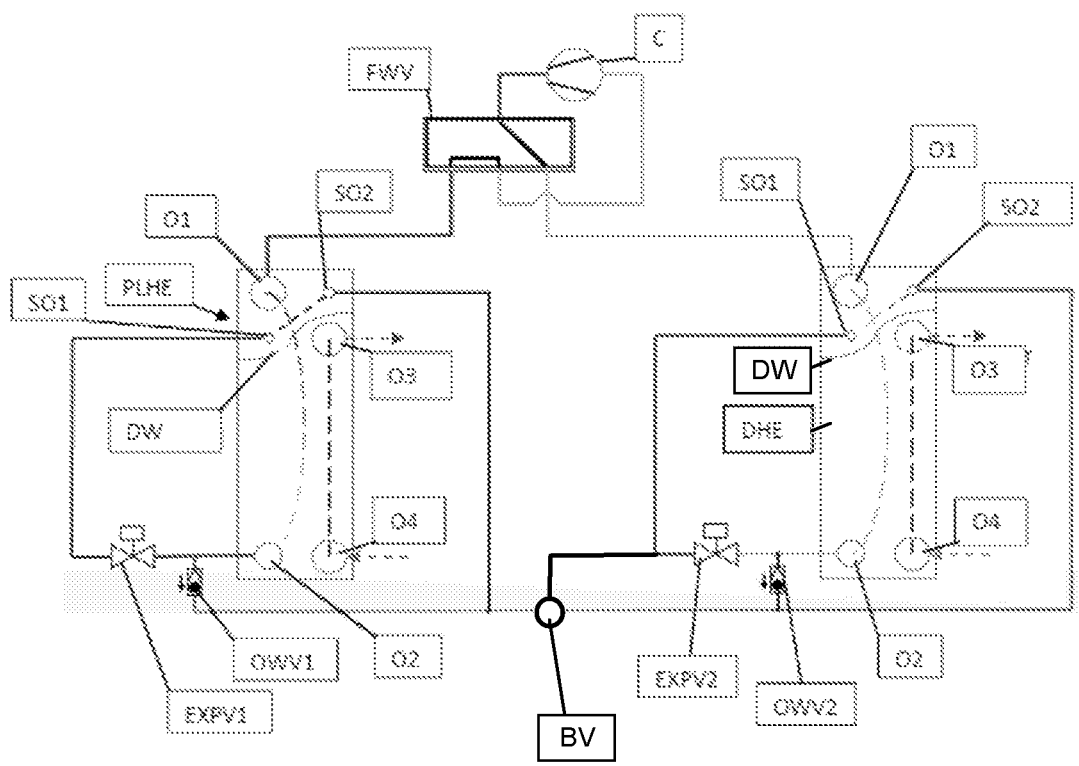
FIG. 11a is a schematic plan view showing the refrigeration system according to the first embodiment in cooling mode.
Figure 11B:
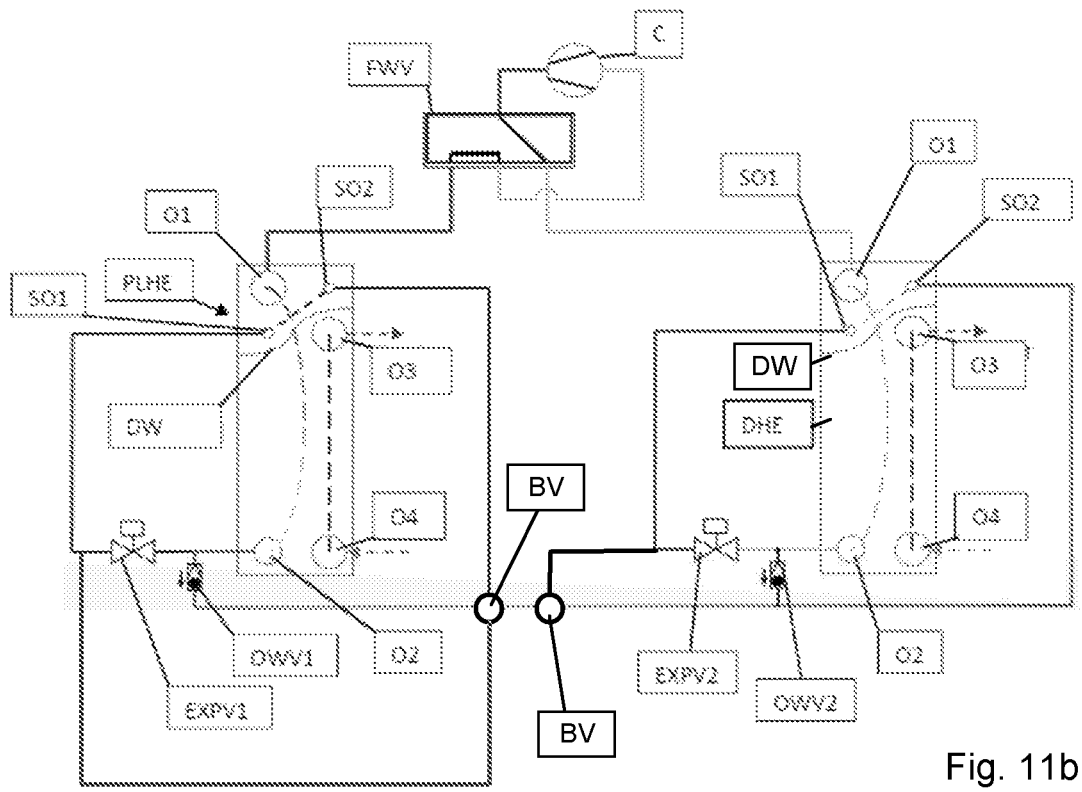
FIG. 11b is a schematic plan view showing the refrigeration system according to the second embodiment in cooling mode.

In FIGS. 11a, 11b, the chiller system is shown in cooling mode. In order to switch mode from heating mode to cooling mode, the four-way valve FWV is controlled such that the compressor feeds compressed gaseous refrigerant to the opening O1 of the dump heat exchanger DHE. The expansion valve EXPV2 will be entirely closed, the one-way valve OWV2 will be open, the one-way valve OWV1 will be closed and the expansion valve EXPV1 will be open to control the pressure before and after the refrigerant has passed the expansion valve EXPV1.

Hence, in cooling mode, the dump heat exchanger will function as a counter-current condenser, and the "suction gas heat exchanger" thereof will not perform any heat exchange, whereas the pay-load heat exchanger PLHE will function as a co-current evaporator. However, due to the provision of the suction gas heat exchange between the hot liquid refrigerant and semi-vaporised refrigerant about to leave the pay-load heat exchanger PLHE, the efficiency of the co-current heat exchange can be maintained at acceptable levels.

It should be noted that the suction gas heat exchanging parts are integrated with the dump heat exchanger DHE and the pay-load heat exchanger PLHE in FIGS. 10a, 10b and 11a, 11b. In other embodiments, however, the suction gas heat exchangers may be separated from the dump heat exchanger and/or the pay-load heat exchanger.

In different climate zones, there are different needs for cooling and heating. In a warmer climate there is a larger need for cooling, wherein the refrigeration system will be used closer to the full cooling effect and a corresponding capacity in the suction gas heat exchanger is required to evaporate any droplets that otherwise would exit the evaporator. For example, the evaporator is the pay-load heat exchanger PLHE in cooling mode of the refrigeration system as described above, wherein the integrated suction gas heat exchanger thereof is used accordingly by means of the balance valve BV, which may be the same or another balance valve as illustrated schematically in FIG. 11b. When the refrigeration system is used at reduced effect, such as at 25% or 50% of the full effect, the suction gas heat exchanger is controlled through the balance valve BV. The refrigeration system is reversible and can be switched between cooling mode and heating mode by the four-way valve FWV as described above. As illustrated in the drawings, both the pay-load heat exchanger and the dump heat exchanger comprises an integrated suction gas heat exchanger which can be activated and controlled by the balance valve BV to ensure evaporation of the refrigerant before exiting the evaporator in both cooling mode and heating mode and with zero superheat in accordance with the effect at which the system is running. Hence, the amount of refrigerant conducted to the suction gas heat exchanger can be adapted to the system conditions in both heating mode and cooling mode to provide an efficient reversible refrigeration system for different types of climates.

Figure 12:
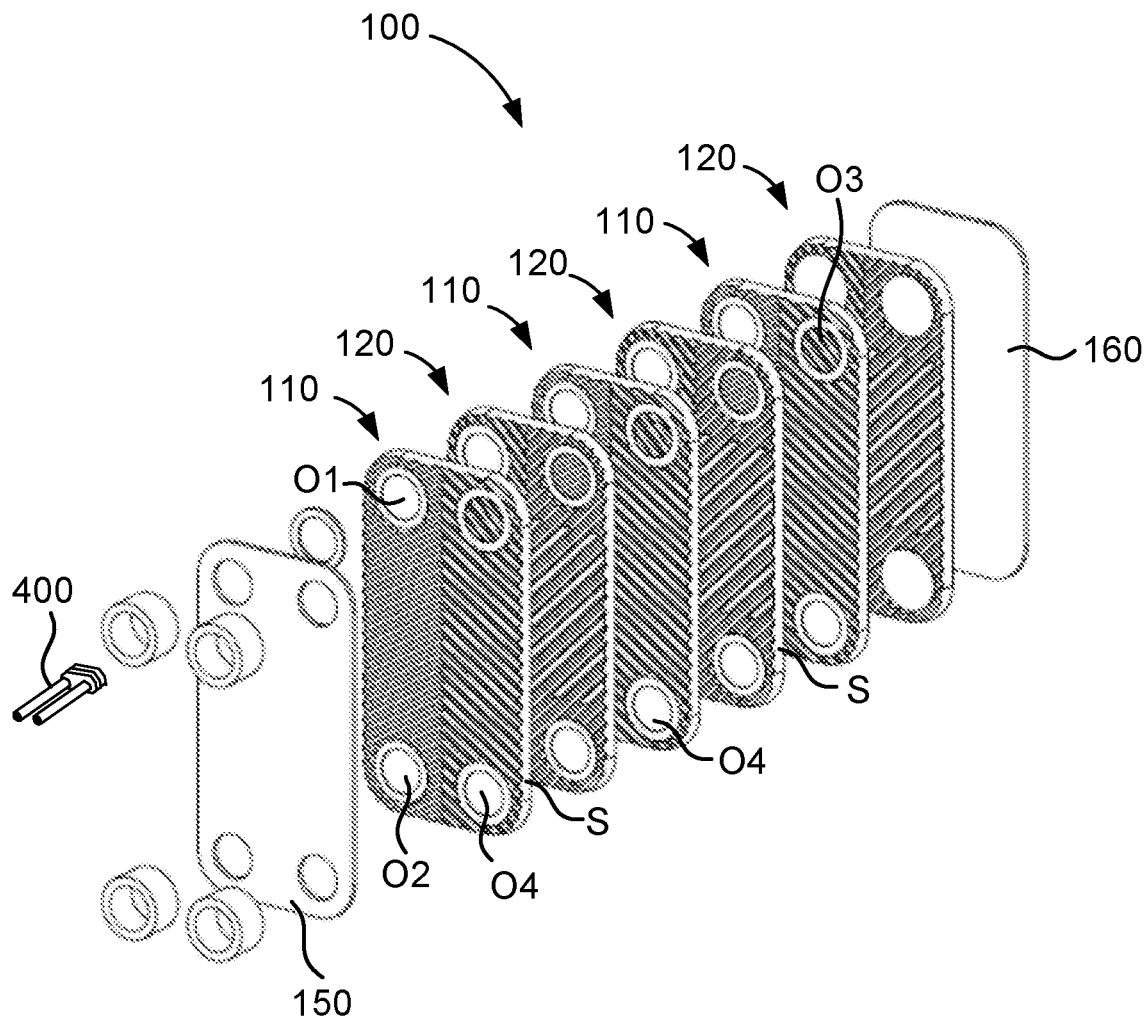
FIG. 12 is an exploded perspective view of a heat exchanger to be fitted with a retrofit port heat exchanger according to one embodiment of the present invention.
Figure 13:
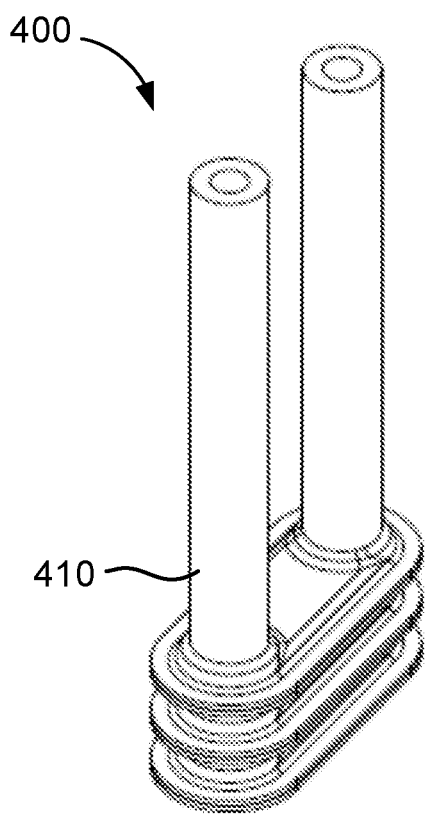
FIG. 13 is a schematic perspective view of a retrofit port heat exchanger according to one embodiment.
Figure 14:
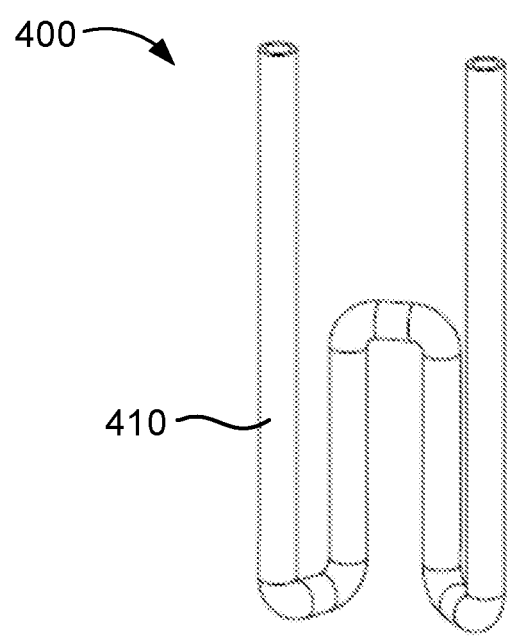
FIG. 14 is a schematic perspective view of a retrofit port heat exchanger according to one alternative embodiment.

In another embodiment of the invention, a "standard" heat exchanger 100, such as for example shown in FIG. 12 may be provided with a retrofit port heat exchanger 400 (see FIGS. 13 and 14) comprising some kind of structure that fits in or just outside a port opening O1-O4 of the standard heat exchanger.

In the shown embodiment, the retrofit port heat exchanger 400 comprises a pipe 410 that suits within the port opening, said pipe being bent in a semi helix for allowing high temperature liquid refrigerant flowing therein in the same way as refrigerant flowing between the small port openings SO1 and SO2 of the previously described embodiments exchanges heat with cold, gaseous (or semi gaseous) refrigerant about to leave the dump heat exchanger DHE or the pay load heat exchanger PLHE.

Figure 15:
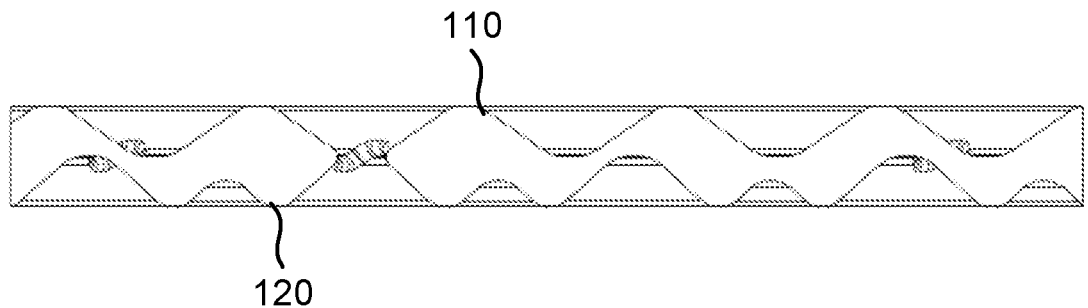
FIG. 15 is a schematic cross section view of a part of a heat exchanger comprising first and second heat exchanger plates according to another embodiment.

With reference to FIG. 15 a cross section of a part of a heat exchanger comprising first and second heat exchanger plates 110, 120 according to another embodiment is illustrated schematically. In the embodiment of FIG. 15 the first heat exchanger plate 110 is a symmetric heat exchanger plate, wherein the second heat exchanger plate 120 is an asymmetric heat exchanger plate as described above. Hence, the corrugation depth of the first heat exchanger plate 110 is constant, wherein the corrugation depth of the second heat exchanger plate 120 is varying. The second heat exchanger plate 120 is formed with at least two different corrugation depths. Also, the first and second heat exchanger plates 110, 120 are formed with corrugated patterns different angles, such as chevron angles, as described above. In the embodiment of FIG. 15 the chevron angle of the first heat exchanger plate 110 is 54 degrees, wherein the chevron angle of the second heat exchanger plate 120 is 61 degrees. For example, neighbouring interplate volumes are different, so that the interplate volume on one side of the first heat exchanger plates 110 is different from the interplate volume on the opposite side of the first heat exchanger plates 110. Of course, this also apply for the second heat exchanger plates 120. Hence, the interplate volume between the first and second heat exchanger plates is different from the interplate volume between the second and first heat exchanger plates. Similarly, a cross section area on one side of the first heat exchanger plates 110 is different from the cross section area on the opposite side of the first heat exchanger plates 110.

Figure 16:
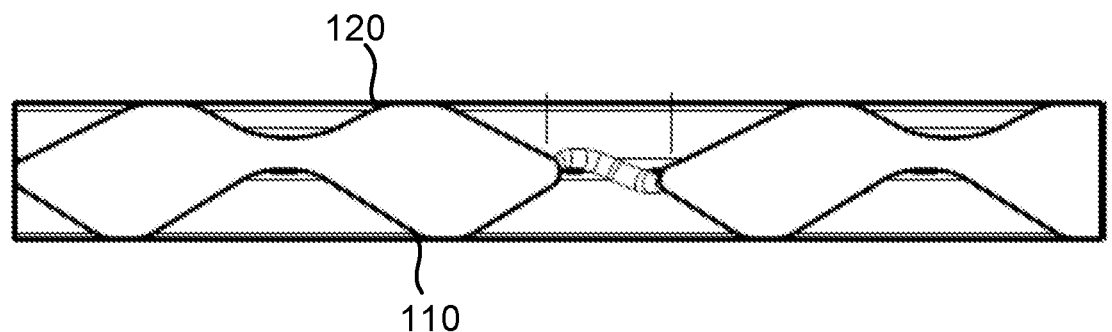
FIG. 16 is a schematic cross section view of a part of a heat exchanger comprising first and second heat exchanger plates according to another embodiment.

With reference to FIG. 16 a cross section of a part of a heat exchanger comprising first and second heat exchanger plates 110, 120 according to yet another embodiment is illustrated schematically. In the embodiment of FIG. 16 the first heat exchanger plate 110 is a symmetric heat exchanger plate, wherein the second heat exchanger plate 120 is an asymmetric heat exchanger plate as described above. In the embodiment of FIG. 16 the chevron angle of the first heat exchanger plate 110 is 45 degrees, wherein the chevron angle of the second heat exchanger plate 120 is 61 degrees.

Figure 17:
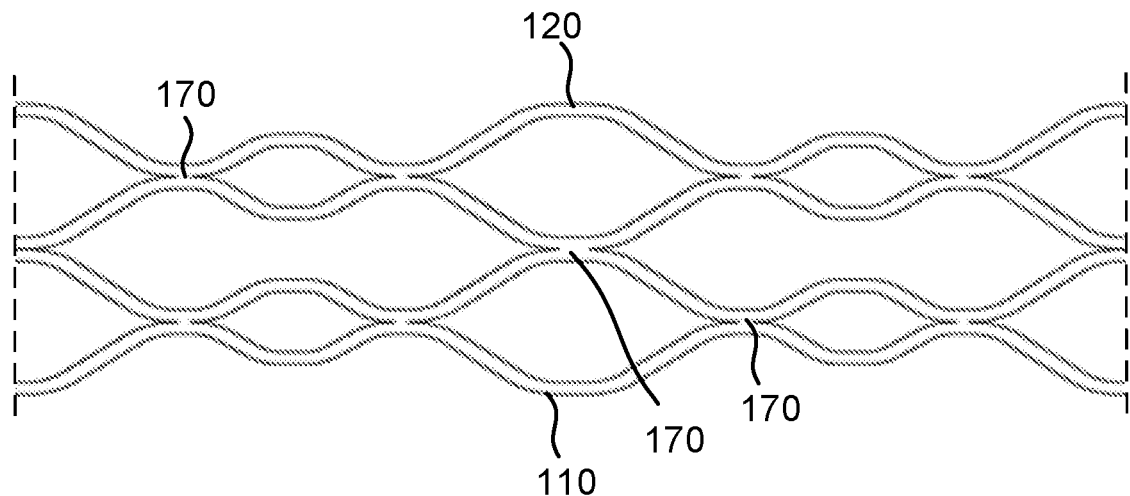
FIG. 17 is a schematic cross section view of a part of a heat exchanger comprising first and second heat exchanger plates according to yet another embodiment.

With reference to FIG. 17 a cross section of a part of a heat exchanger comprising first and second heat exchanger plates 110, 120 according to yet another embodiment is illustrated schematically. In the embodiment of FIG. 17 the first heat exchanger plate 110 is an asymmetric heat exchanger plate, wherein the second heat exchanger plate 120 is also an asymmetric heat exchanger plate. In the embodiment of FIG. 17 the chevron angle of the first heat exchanger plate 110 is different from the chevron angle of the second heat exchanger plate 120 as described above. Also, the interplate flow channels have different volumes as described above. For example, the brazing joints are elongated, such as oval, and arranged in a first orientation in the interplate flow channels having bigger volume and in a different, second orientation in the interplate flow channels having smaller volume.

Figure 18:
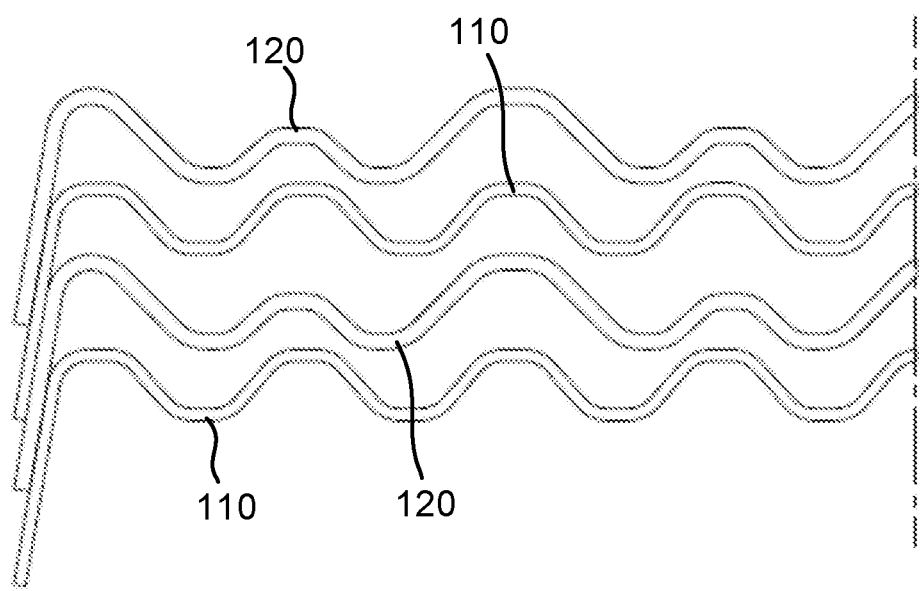
FIG. 18 is a schematic cross section view of a part of a stack of heat exchanger plates of first and second heat exchanger plates having different corrugation depths according to another embodiment.

With reference to FIG. 18 a cross section of a part of a stack of first and second heat exchanger plates 110, 120 according to yet another embodiment is illustrated schematically. In the embodiment of FIG. 18 the first and second heat exchanger plates 110, 120 are provided with different corrugation depths. The first heat exchanger plate 110 is a symmetric heat exchanger plate, wherein the second heat exchanger plate 120 is an asymmetric heat exchanger plate. Alternatively, both the first and second heat exchanger plates 110, 120 are symmetric or asymmetric. The chevron angle of the first heat exchanger plate 110 is different from the chevron angle of the second heat exchanger plate 120 and the interplate flow channel volumes formed by the first and second heat exchanger plates 110, 120 when brazed together in brazing joints are different.

The heat exchanger according to various embodiments of the present invention is, e.g. used for condensation or evaporation, wherein at least one media at some point is in gaseous phase. For example, the heat exchanger is used for heat exchange, wherein condensation or evaporation takes place in the interplate flow channels of bigger volume. For example, a liquid media, such as water or brine, is conducted through the interplate flow channels having smaller volume.

Figure 19:
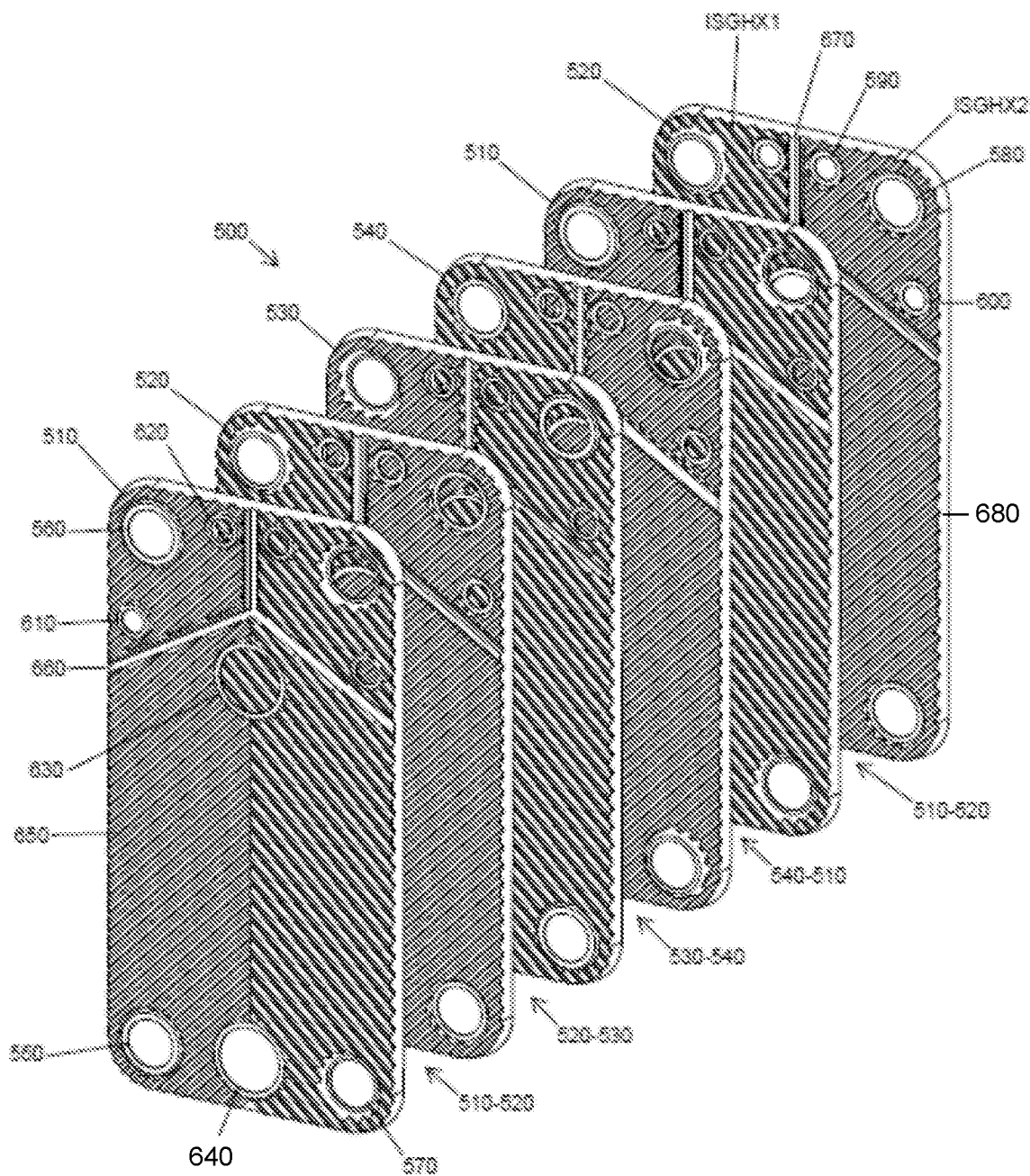
FIG. 19 is a schematic exploded perspective view of a true dual heat exchanger according to one embodiment of the present invention, said heat exchanger comprising dual integrated suction gas heat exchangers.

In FIG. 19, an exemplary brazed true-dual heat exchanger 500 comprising two separate integrated suction gas heat exchangers ISGHX1 and ISGHX2 is shown in an exploded view. True-dual heat exchangers are used for heat-pumps or chillers where a large power ratio is required. Systems for true-dual heat exchangers are well known for people skilled in the art—they generally consist of two separate heat pump systems using a true-dual heat exchanger rather than two separate heat exchangers.

The true-dual heat exchanger 500 comprises six heat exchanger plates 510, 520, 530 and 540, four of which are different from each other. Each of the heat exchanger plates is provided with a pressed pattern of ridges and grooves adapted to keep the plates on a distance from one another such that interplate flow channels 510-520, 520-530, 530-540, 540-510, 510-520 for media to exchange heat are formed between the heat exchanger plates. Also, each of the heat exchanger plates is provided with port openings 550, 560, 570, 580, 590, 600, 610 for refrigerant and two port openings 620, 630 for water or brine solution. The port openings are in selective fluid communication with the interplate flow channels in the following manner:

The port openings 630 and 640 are in fluid communication with the interplate flow channels 510-520 and 530-540, the port openings 550 and 560 are in fluid communication with the interplate flow channels 520-530, the port openings 570 and 580 are in fluid communication with the interplate flow channels 540-510, and the port openings 590, 600,610 and 620 are in fluid communication with the interplate flow channels as described below.

The heat exchanger plates 510, 520, 530 and 540 are divided into subsections wherein the interplate flow channels are connected and restricted in certain ways: in a main section 650, all interplate flow sections are used for media to exchange heat; in a first isghx (integrated suction gas heat exchanger) section ISGHX1, the interplate flow channels 520-530 are fluidly connected to the interplate flow channel 520-530 of the main section and either or both of the interplate flow channels 510-520 and/or 530-540 are connected to the port openings 610 and 620; and in a second isghx section ISGHX2, the interplate flow channels 540-510 are fluidly connected to the interplate flow channels 540-510 of the main section and either or both of the interplate flow channels 510, 520 and/or 530-540 are fluidly connected to the port openings 590, 600.

The main section is delimited from the isghx sections ISGHX1 and ISGHX2 by a dividing wall 660, which extends from one long side of each heat exchanger plate to the other long side. The dividing wall comprises plate surfaces arranged on different heights such that cooperation between such plate surfaces of neighbouring plates seals off the interplate flow channels 510-520 and 530-540 from communication with the corresponding interplate flow channels of the isghx sections ISGHX1 and ISGHX2. Moreover, the plate surfaces of the dividing wall 660 are configured such that cooperation between the plate surfaces of neighbouring plates seal off communication between the interplate flow channel 520-530 of the main section and the corresponding interplate flow channel of the second isghx section ISGHX2 and seals off communication between the interplate flow channel 540-510 of the main section and the corresponding interplate flow channels of the first isghx section ISGHX1. The dividing wall 660 divides the heat exchanger plates 510-540 into the main section 650 and the isghx subsections ISGHX1 and ISGHX2. Hence, four of the port openings are arranged in the main section 650, i.e. the port openings 550, 570, 630 and 640, wherein the port openings 560 and 580 along with the first and second isghx sections ISGHX1 and ISGHX2 with the port openings 610, 620, 590, 600 are arranged on the other side of the dividing wall 660.

A second dividing wall 670 is provided between the isghx sections ISGHX1 and ISGHX2 and extends from a short side of the heat exchanger plates and the dividing wall 660. Plate surfaces of this dividing wall are arranged such that plate surfaces of neighbouring plates contact one another for sealing off all interplate flow channels of the isghx sections ISGHX1 and ISGHX2 from communication with one another. Hence, the port opening 560 and the first isghx section with the port openings 610 and 620 are arranged on one side of the dividing wall 670, wherein the port opening 580 and the second isghx section with the port openings 590 and 600 are arranged on the other side of the dividing wall 670. Hence, the main section 650m the first isghx section ISGHX1 and the second isghx section ISGHX2 are separated by the dividing walls 660, 670.

Finally, each of the heat exchanger plates are provided with a skirt 680 that extends around the entire periphery of the heat exchanger plates 510, 520, 530, 540, the skirts 680 of neighbouring plates being adapted to contact one another in order to create a circumferential seal stopping media from escaping the interplate flow channels. Moreover, the heat exchanger 500 according to the invention is preferably provided with a start and/or end plate (not shown), which are/is arranged on either sides of the stack of heat exchanger plates. Either of the start or end plate is provided with port openings, while the other is not, in order to create for a seal on the side of the port opening that is not provided with a connection for letting fluid to exchange heat in or out from the heat exchanger.

By the above arrangement, a true-dual heat exchanger having separate interplate flow channels between port openings 630 and 640 over the interplate flow channels 510-520 and 530-540 of the main section 650, between port openings 550 and 560 over the interplate flow channel 520-530 of the main section and the first isghx section ISGHX1, between port openings 570 and 580 over the interplate flow channel 540-510 of the main section 650 and the second isghx section ISGHX2, between port openings 610 and 620 over the interplate flow channel 520-530 of the first isghx section ISGHX1 and between port openings 590 and 600 over the interplate flow channel 540-510 of the second isghx section ISGHX2, respectively.

The selective fluid communication between the port openings and the interplate flow channels can be achieved in a number of ways, e.g. by providing surfaces around the port openings on different heights, such that the surfaces of neighbouring plates contact one another or do not contact one another. Alternatively, the selective fluid communication can be achieved by providing separate sealing rings in the port openings, said sealing rings being provided with openings for allowing communication where desired.

Also, it should be noted that although described as a brazed heat exchanger, it is possible to design a true-dual heat exchanger according to the invention as a gasketed heat exchanger.

The true-dual heat exchanger 500 according to the present invention is especially useful for heat pump or chiller applications wherein dual compressors are used in order to attain a large ratio between a low power and a high power.

The heat exchanger plates 510-540 are provided with the first and second patterns of ridges R1, R2$a$, R2$b$ and grooves G1, G2$a$, G2$b$ as described above with reference to FIGS. 2-9. For example, every other heat exchanger plate is provided with the first pattern, wherein the other heat exchanger plates are provided with the second pattern. For example, the heat exchanger plates 510, and 530 are provided with the first pattern, wherein the heat exchanger plates 520, 540 are provided with the second pattern or vice versa. The pressed first and second patterns are, e.g. herringbone patterns with different chevron angles or pressed patterns of oblique lines with different angles as described above, such as described with reference to FIGS. 6$a$, 6$b$, 7$a$, and 7$b$. The main sections 650 are provided with such patterns and, e.g. also the first and second isghx sections ISGHX1 and ISGHX2 are provided with such patterns. For example, the angle $\beta 1$, such as the chevron angle $\beta 1$, of every other heat exchanger plate, such as the heat exchanger plates 510, 530, is 25° to 70° or 30° to 45°. For example, the angle $\beta 2$, such as the chevron angle $\beta 2$, of every other heat exchanger plate, such as the heat exchanger plates 520, 540, is 25° to 70° or 30° to 45°. The first and second patterns are in opposite directions, so that the angles or chevron apices alternatingly are in opposite directions throughout the heat exchanger. For example, the difference between the first and second chevron angles β1 and β2 is 2° to 35°.

For example, the grooves G1 of every other heat exchanger plate are formed with identical depth D1, as described with reference to FIG. 3, wherein the other heat exchanger plates having the first and second grooves G2a, G2b are formed with different depths, wherein the first grooves G2a are formed with a first depth D2a, and the second grooves G2b are formed with a second depth D2b as described with reference to FIG. 4. Hence, every other interplate flow channel has bigger volume than the rest as also described above.

For example, the contact points and brazing joints are alternatingly arranged as described with reference to FIGS. 8 and 9, so that the brazing joints between the heat exchanger plates 510-540 are elongated, such as oval, wherein the brazing joints are arranged in a first orientation in the interplate flow channels having bigger volume and in a second orientation in the interplate flow channels having smaller volume.

Figure 20:
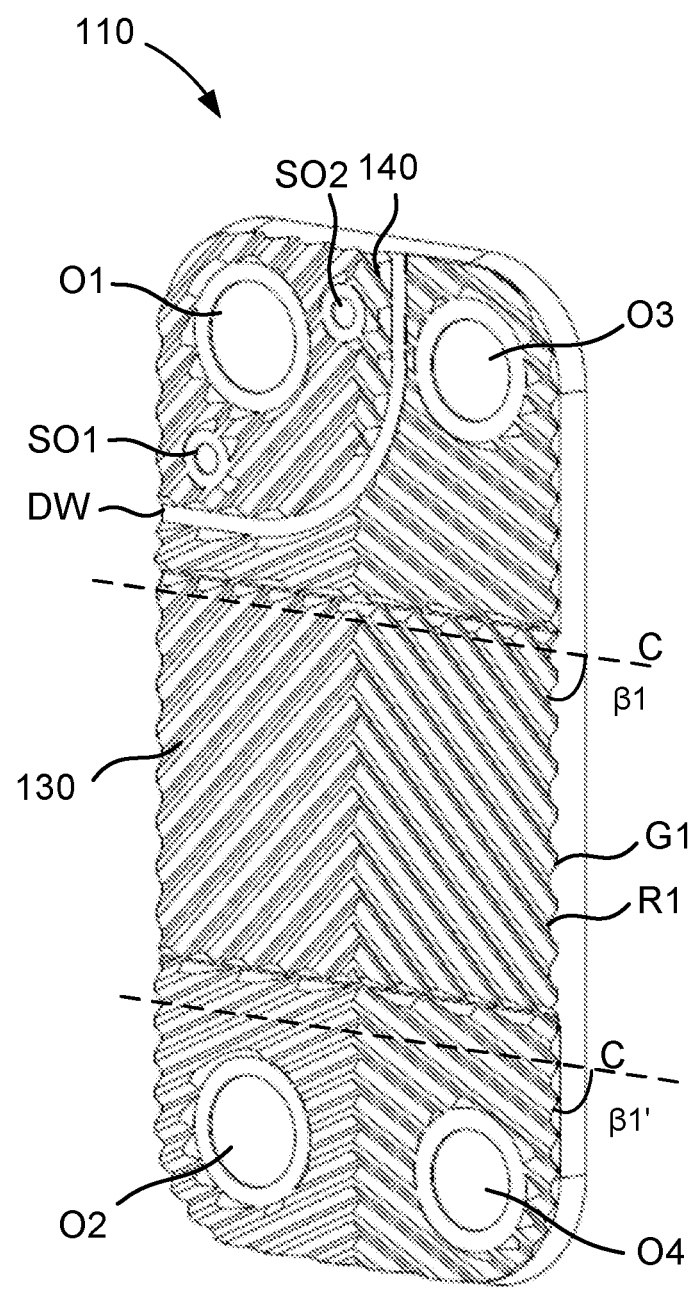
FIG. 20 is a schematic perspective view of another embodiment of the corrugated pattern of the heat exchanger plates, illustrating a corrugated pattern wherein the angle of the corrugated pattern in a central main heat exchanging section differs from the angle in sections at port openings of the heat exchanger plates.

With reference to FIG. 20 the first pattern of ridges R1 and grooves G1 of the first heat exchanger plate 110 is illustrated schematically. In FIG. 20 the first heat exchanger plate 110 comprises the small port openings SO1, SO2 and the dividing surface DW to provide the first heat exchanging portion 130 and the second heat exchanging portion 140 forming the integrated suction gas heat exchanger as described above. Alternatively, the first heat exchanger plate 110 comprises the dividing walls 660, 670 and the small port openings 590-620 to provide the two integrated suction gas heat exchangers ISGHX1, ISGHX2 as described with reference to FIG. 19. The pressed pattern according to the embodiment of FIG. 20 is a herringbone pattern but may alternatively be a pattern of oblique lines and thus exhibits the first angle β1 generally as described above with reference to FIGS. 6a and 6b but in a central main heat exchanging section of the heat exchanger plate 110. Hence, the first pressed pattern partially comprises the first angle β1. For example, the central main heat exchanging section extends across the first heat exchanger plate 110 from one side to the opposite side. The central main heat exchanging section is arranged between first and second heat exchanging sections at port openings of the heat exchanger plate, called end sections herein. The first and second end sections are, for example, arranged at opposite ends of the first heat exchanger plate 110. For example, the first and second end sections extend across the first heat exchanger plate 110 from one side to the opposite side thereof. The first end section includes port openings, such as the first port opening O1 and the third port opening O3, and the small port openings SO1, SO2 and the dividing surface DW forming the suction gas heat exchanger. The second end section includes port openings, such as the second and fourth port openings O2, O4. The pressed pattern of ridges and grooves R1, G1 is arranged with an angle β1' in at least one end section, such as the first and second end sections, which angle β1' differs from the angle β1 of the pressed pattern in the central main heat exchanging section. For example, the direction of the pressed pattern is the same in the central main section as in the end sections. For example, the angle is the same in both end sections. Alternatively, the angle in the first end section is different from the angle in the second end section. Optionally, the second heat exchanging portion 140 is arranged with a pattern or an angle different from the first end section. In FIG. 20 the first heat exchanger plate 110 is illustrated as an example but it is understood that the second pressed pattern of the second heat exchanger plate 120 is designed in a corresponding manner, wherein the second pattern of ridges R2a, R2b and grooves G2a, G2b is arranged with the angle β2 in the central main heat exchanging section and the end sections are arranged with a different angle β2' (not illustrated).

The invention claimed is:

1. A brazed plate heat exchanger comprising a plurality of first heat exchanger plates and second heat exchanger plates,
   wherein the first heat exchanger plates are formed with a first pattern of ridges and grooves, and the second heat exchanger plates are formed with a second pattern of ridges and grooves providing contact points between at least some crossing ridges and grooves of neighbouring plates under formation of interplate flow channels for fluids to exchange heat, said interplate flow channels being in selective fluid communication with a first large port opening, a second large port opening, a third large port opening, and a fourth large port opening, and a first small port opening and a second small port opening,
   wherein the first heat exchanger plates and the second heat exchanger plates are formed with a dividing surface dividing the heat exchanger plates into a first heat exchanging portion and a second heat exchanging portion, so that fluid passing between the first large port opening and the second large port opening exchanges heat with fluid passing between the third large port opening and the fourth large port opening over the first heat exchanging portion of each of the plurality of first heat exchanger plates and second heat exchanger plates and fluid passing between the first small port opening and the second small port opening over the second heat exchanging portion of each plate,
   wherein the ridges and grooves are formed such that the interplate flow channels between different plate pairs have a first volume and a second volume, wherein the first volume is greater than the second volume,
   wherein brazing joints are provided at the contact points, and the brazing joints are elongated, wherein the elongated brazing joints comprise first elongated brazing joints extending in a first orientation and second elongated brazing joints extending in a second orientation, and wherein the first orientation and the second orientation are different,
   wherein the first elongated brazing joints extend at a first brazing joint angle and are located in the interplate flow channels having the first volume, the second elongated brazing joints extend at a second brazing joint angle and are located in the interplate flow channels having the second volume,
   wherein the ridges and grooves of the first heat exchanger plates, at least in a central main heat exchanging section of the first heat exchanger plates, extend in a first angle, and the ridges and grooves of the second heat exchanger plates, at least in a central main heat exchanging section of the second heat exchanger plates, extend in a second angle, wherein a difference between the first angle and the second angle is 2° to 35°, and
   wherein the grooves of the first heat exchanger plates are formed with identical corrugation depth, wherein first grooves of the second heat exchanger plates are formed with a first depth, and second grooves of the second heat exchanger plates are formed with a second depth different from the first depth.

2. The plate heat exchanger of claim 1, wherein the first heat exchanger plates and the second heat exchanger plates are arranged alternatingly.

3. The plate heat exchanger of claim 1, wherein the first pattern of ridges and grooves is a first herringbone pattern or a first pattern of obliquely extending straight lines and the second pattern of ridges and grooves is a second herringbone pattern or a second pattern of obliquely extending straight lines, and wherein some of the ridges and grooves of the first pattern of ridges and grooves and the second pattern of ridges and grooves extend from one long side of the heat exchanger plates to another long side of the heat exchanger plates.

4. The plate heat exchanger of claim 1, wherein the dividing surface extends between two neighbouring sides of the plurality of first heat exchanger plates and second heat exchanger plates.

5. The plate heat exchanger of claim 1, wherein one of the large port openings is located within an area delimited by the dividing surface.

6. The plate heat exchanger of claim 1, wherein three of the large port openings are located outside an area delimited by the dividing surface.

7. The plate heat exchanger of claim 1, wherein the brazing joints are oval.

8. A refrigeration system comprising:
a compressor for compressing a gaseous refrigerant, such that a temperature and a pressure of the gaseous refrigerant increases, wherein a boiling point of the gaseous refrigerant increases;
a condenser, in which the gaseous refrigerant from the compressor exchanges heat with a high temperature heat carrier, said heat exchange resulting in the gaseous refrigerant condensing to a liquid refrigerant;
an expansion valve reducing a pressure of the liquid refrigerant from the condenser, hence reducing the boiling point of the refrigerant;
an evaporator, in which the liquid refrigerant exchanges heat with a low temperature heat carrier, such that the refrigerant vaporizes;
a suction gas heat exchanger exchanging heat between the liquid refrigerant from the condenser and the gaseous refrigerant from the evaporator,
wherein the evaporator is formed by a plate heat exchanger comprising first heat exchanger plates formed with a first pattern of ridges and grooves, and second heat exchanger plates formed with a second pattern of ridges and grooves providing contact points between at least some crossing ridges and grooves of neighbouring plates under formation of interplate flow channels for fluids to exchange heat,
wherein the ridges and grooves are formed such that the interplate flow channels between different plate pairs have a first volume and a second volume, wherein the first volume is greater than the second volume;
wherein brazing joints are provided at the contact points, and the brazing joints are elongated, wherein the elongated brazing joints comprise first elongated brazing joints extending in a first orientation and second elongated brazing joints extending in a second orientation, and wherein the first orientation and the second orientation are different,
wherein the first elongated brazing joints extend at a first brazing joint angle and are located in the interplate flow channels having the first volume, the second elongated brazing joints extend at a second brazing joint angle and are located in the interplate flow channels having the second volume,
wherein the ridges and grooves of the first heat exchanger plates, at least in a central main heat exchanging section of the first heat exchanger plates, extend in a first angle, and the ridges and grooves of the second heat exchanger plates, at least in a central main heat exchanging section of the second heat exchanger plates, extend in a second angle, wherein a difference between the first angle and the second angle is 2° to 35°, and
wherein the grooves of the first heat exchanger plates are formed with identical corrugation depth, wherein first grooves of the second heat exchanger plates are formed with a first depth, and second grooves of the second heat exchanger plates are formed with a second depth different from the first depth.

9. The refrigeration system of claim 8, further comprising means for controlling the amount of heat exchange in the suction gas heat exchanger.

10. The refrigeration system of claim 8, further comprising a four-way valve, so that the refrigeration system is reversible.

11. The refrigeration system of claim 8, wherein the ridges and grooves of the first heat exchanger plates, at least in a central main heat exchanging section of the first heat exchanger plates, extend in a first angle, and the ridges and grooves of the second heat exchanger plates, at least in a central main heat exchanging section of the second heat exchanger plates, extend in a second angle different from the first angle.

12. The refrigeration system of claim 8, wherein the brazing joints are oval.

13. The refrigeration system of claim 9, wherein the means for controlling the amount of heat exchange in the suction gas heat exchanger is a controllable balance valve, which controls the amount of refrigerant bypassing the suction gas heat exchanger.

14. The refrigeration system of claim 9, wherein the means for controlling the amount of heat exchange in the suction gas heat exchanger comprises dual expansion valves, and wherein a first of the expansion valves is connected between an inlet of the evaporator and the suction gas heat exchanger and a second of the expansion valves is connected between the inlet of the evaporator and the condenser.

15. The refrigeration system of claim 13, wherein the controllable balance valve bypasses liquid refrigerant from the condenser past the suction gas heat exchanger.

16. A refrigeration method comprising the steps of:
a) compressing a gaseous refrigerant by a compressor, such that a temperature and a pressure of the gaseous refrigerant increases, wherein a boiling point of the gaseous refrigerant increases;
b) conducting the gaseous refrigerant from the compressor to a condenser;
c) in the condenser, exchanging heat between the gaseous refrigerant from the compressor and a high temperature heat carrier, said heat exchange resulting in the gaseous refrigerant condensing to liquid refrigerant;
d) reducing the pressure of the liquid refrigerant from the condenser in an expansion valve, hence reducing the boiling point of the refrigerant;
e) conducting the refrigerant with reduced boiling point to an evaporator;

f) in the evaporator, exchanging heat between the refrigerant and a low temperature heat carrier, such that the refrigerant vaporizes; and g) exchanging heat between high temperature liquid refrigerant from the condenser and high temperature gaseous refrigerant from the evaporator by means of a suction gas heat exchanger, wherein the method further comprises:

in step f), conducting the refrigerant through interplate flow channels formed by first heat exchanger plates formed with a first pattern of ridges and grooves, and second heat exchanger plates formed with a second pattern of ridges and grooves providing contact points between at least some crossing ridges and grooves of neighbouring plates under formation of the interplate flow channels for fluids to exchange heat, wherein the ridges and grooves are formed such that the interplate flow channels between different plate pairs have a first volume and a second volume, wherein the first volume is greater than the second volume, wherein brazing joints are provided at the contact points, and the brazing joints are elongated, wherein the elongated brazing joints comprise first elongated brazing joints extending in a first orientation and second elongated brazing joints extending in a second orientation, and wherein the first orientation and the second orientation are different, wherein the first elongated brazing joints extend at a first brazing joint angle and are located in the interplate flow channels having the first volume, the second elongated brazing joints extend at a second brazing joint angle and are located in the interplate flow channels having the second volume, wherein the ridges and grooves of the first heat exchanger plates, at least in a central main heat exchanging section of the first heat exchanger plates, extend in a first angle, and the ridges and grooves of the second heat exchanger plates, at least in a central main heat exchanging section of the second heat exchanger plates, extend in a second angle, wherein a difference between the first angle and the second angle is 2° to 35°, and wherein the grooves of the first heat exchanger plates are formed with identical corrugation depth, wherein first grooves of the second heat exchanger plates are formed with a first depth, and second grooves of the second heat exchanger plates are formed with a second depth different from the first depth.

17. The refrigeration method of claim 16, wherein the brazing joints are oval.

* * * * *